US011107296B2

(12) United States Patent
Vespia et al.

(10) Patent No.: US 11,107,296 B2
(45) Date of Patent: Aug. 31, 2021

(54) INTELLIGENT PARKING MANAGEMENT SYSTEM AND METHOD

(71) Applicants: Mark T. Vespia, Pompano Beach, FL (US); Mathieu Philippe Boileau, Fort Laduerdale, FL (US)

(72) Inventors: Mark T. Vespia, Pompano Beach, FL (US); Mathieu Philippe Boileau, Fort Laduerdale, FL (US)

( * ) Notice: Subject to any disclaimer, the term of this patent is extended or adjusted under 35 U.S.C. 154(b) by 0 days.

(21) Appl. No.: 15/082,182

(22) Filed: Mar. 28, 2016

(65) Prior Publication Data
US 2017/0278311 A1    Sep. 28, 2017

(51) Int. Cl.
*G07B 15/02* (2011.01)
*G06K 9/32* (2006.01)
(Continued)

(52) U.S. Cl.
CPC ......... *G07B 15/02* (2013.01); *G06K 9/00771* (2013.01); *G06K 9/325* (2013.01);
(Continued)

(58) Field of Classification Search
CPC ........ G07B 15/04; G07B 15/02; G06Q 10/02; G06Q 50/163; G06Q 2240/00;
(Continued)

(56) References Cited

U.S. PATENT DOCUMENTS 6,081,206 A * 6/2000 Kielland ............ G06Q 30/0284
                                            194/902
7,068,185 B2 * 6/2006 Kavner .................. G07B 15/06
                                            235/384
(Continued)

FOREIGN PATENT DOCUMENTS

WO    WO 2013163371 A1 * 10/2013 ............ G07B 15/02

OTHER PUBLICATIONS

Parking Boss, "What is a Virtual Parking Attendant and how can it fix the guest parking problems in my community?" Feb. 22, 2016 <https://parkingboss.com/blog/2016/2/21/what-is-a-virtual-parking-attendant-and-how-can-it-fix-the-guest-parking-problems-in-my-community>.*

(Continued)

*Primary Examiner* — Michael P Harrington
*Assistant Examiner* — Brian T Tallman
(74) *Attorney, Agent, or Firm* — Mark C. Johnson; Johnson Dalal

(57) ABSTRACT

An intelligent parking management system for residential communities is disclosed that includes a license plate reader; and a server communicatively coupled to the license plate reader over a network. The server includes a memory storing a parking policy and registered license places for one or more residential communities registered with the at least one server; and at least one processor. The processor is operably configured to receive a license plate number, over the network, from the license plate reader; compare the license plate number to a plurality of registered license plate numbers stored in the memory; and communicate, over the network, a parking violation message as a result of determining that the license plate number does not match any one of the plurality of registered license plate numbers to a user such as a resident, a towing company, or administrator.

10 Claims, 12 Drawing Sheets

(51) Int. Cl.
*G06K 9/62* (2006.01)
*G06K 9/00* (2006.01)
*G06Q 50/30* (2012.01)
*G06Q 10/00* (2012.01)
G06K 9/22 (2006.01)
H04L 29/08 (2006.01)
G07B 15/00 (2011.01)
G06F 21/31 (2013.01)

(52) U.S. Cl.
CPC .......... *G06K 9/6201* (2013.01); *G06Q 10/00* (2013.01); *G06Q 50/30* (2013.01); *G06F 21/31* (2013.01); *G06K 9/22* (2013.01); *G06K 2209/01* (2013.01); *G06K 2209/15* (2013.01); *G07B 15/00* (2013.01); *H04L 67/00* (2013.01); *H04L 67/04* (2013.01); *H04L 67/10* (2013.01); *H04L 67/12* (2013.01); *H04L 67/125* (2013.01); *H04L 67/18* (2013.01)

(58) Field of Classification Search
CPC .......... G06Q 30/0258; G06Q 30/0266; G06Q 30/0645; G08G 1/148
USPC ............................................ 705/13; 382/105
See application file for complete search history.

(56) References Cited

U.S. PATENT DOCUMENTS

| | | | | |
|---|---|---|---|---|
| 7,075,427 | B1* | 7/2006 | Pace | B61L 23/06 246/125 |
| 2002/0093425 | A1* | 7/2002 | Puchek | G07C 9/37 340/540 |
| 2004/0068433 | A1* | 4/2004 | Chatterjee | G06Q 20/127 705/13 |
| 2006/0173733 | A1* | 8/2006 | Fancher | G06Q 10/06 705/13 |
| 2006/0212344 | A1* | 9/2006 | Marcus | G07B 15/02 705/13 |
| 2009/0070156 | A1* | 3/2009 | Cleland-Pottie | G06Q 10/02 705/5 |
| 2009/0204319 | A1* | 8/2009 | Shanbhag | G01C 21/3423 701/533 |
| 2009/0240565 | A1* | 9/2009 | Calonge | G06Q 20/102 705/307 |
| 2010/0128931 | A1* | 5/2010 | Bongard | G07B 15/00 382/105 |
| 2010/0175323 | A1* | 7/2010 | Plaster | G07C 9/00087 49/70 |
| 2011/0099126 | A1* | 4/2011 | Belani | G06Q 30/0284 705/418 |
| 2012/0323643 | A1* | 12/2012 | Volz | G07B 15/02 705/13 |
| 2014/0214500 | A1* | 7/2014 | Hudson | G06Q 30/0284 705/13 |
| 2014/0324714 | A1* | 10/2014 | Kimball | G06Q 50/163 705/314 |
| 2015/0138001 | A1* | 5/2015 | Davies | G08G 1/149 340/932.2 |
| 2015/0142533 | A1* | 5/2015 | Shalev | G06Q 50/30 705/13 |

OTHER PUBLICATIONS

Parking Boss, "Security & Enforcement" webpage <http://www.parkingboss.com/community/enforcement> (<http://web.archive.org/web/20151112232755/http://www.parkingboss.com/community/enforcement/> captured on Nov. 12, 2015).*
Parking Boss, "A History of Everything" Nov. 5, 2015 <http://www.parkingboss.com/blog/2015/11/5/a-history-of-everything> Nov. 5, 2015 (<http://web.archive.org/web/20151121025511/http://www.parkingboss.com/blog/2015/11/5/a-history-of-everything> captured on Nov. 21, 2015).*
Parking Boss, "Guest Parking" webpage <https://parkingboss.com/community/guests> (<http://web.archive.org/web/20151113112252/http://www.parkingboss.com/community/guests> captured on Nov. 13, 2015).*
Parking Boss, "Security & Enforcement" webpage <http://parkingboss.com/community/security> (<http://web.archive.org/web/20141114172910/http://parkingboss.com/community/security> captured on Nov. 14, 2014).*
University of Michigan, "Parking Policies" webpage <http://www.housing.umich.edu/undergrad/parking> (<http://web.archive.org/web/20150227212422/http://www.housing.umich.edu/undergrad/parking> captured on Feb. 27, 2015).*
University of Michigan 'Undergraduate Parking and Permits' webpage <http://www.housing.umich.edu/undergrad/parking> (<http://web.archive.org/web/20150227212422/http://www.housing.umich.edu/undergrad/parking> captured on Feb. 27, 2015). (Year: 2015).*
HOAleader.com "HOA Fees on Rentals: Can Your HOA Impose a Fee Just Because Owners Rent Their Unit?" (Dec. 2011) <https://www.hoaleader.com/public/652.cfm> (<http://web.archive.org/web/20160321084158/https://www.hoaleader.com/public/652.cfm> captured using Wayback Machine on Mar. 21, 2016). (Year: 2016).*

* cited by examiner

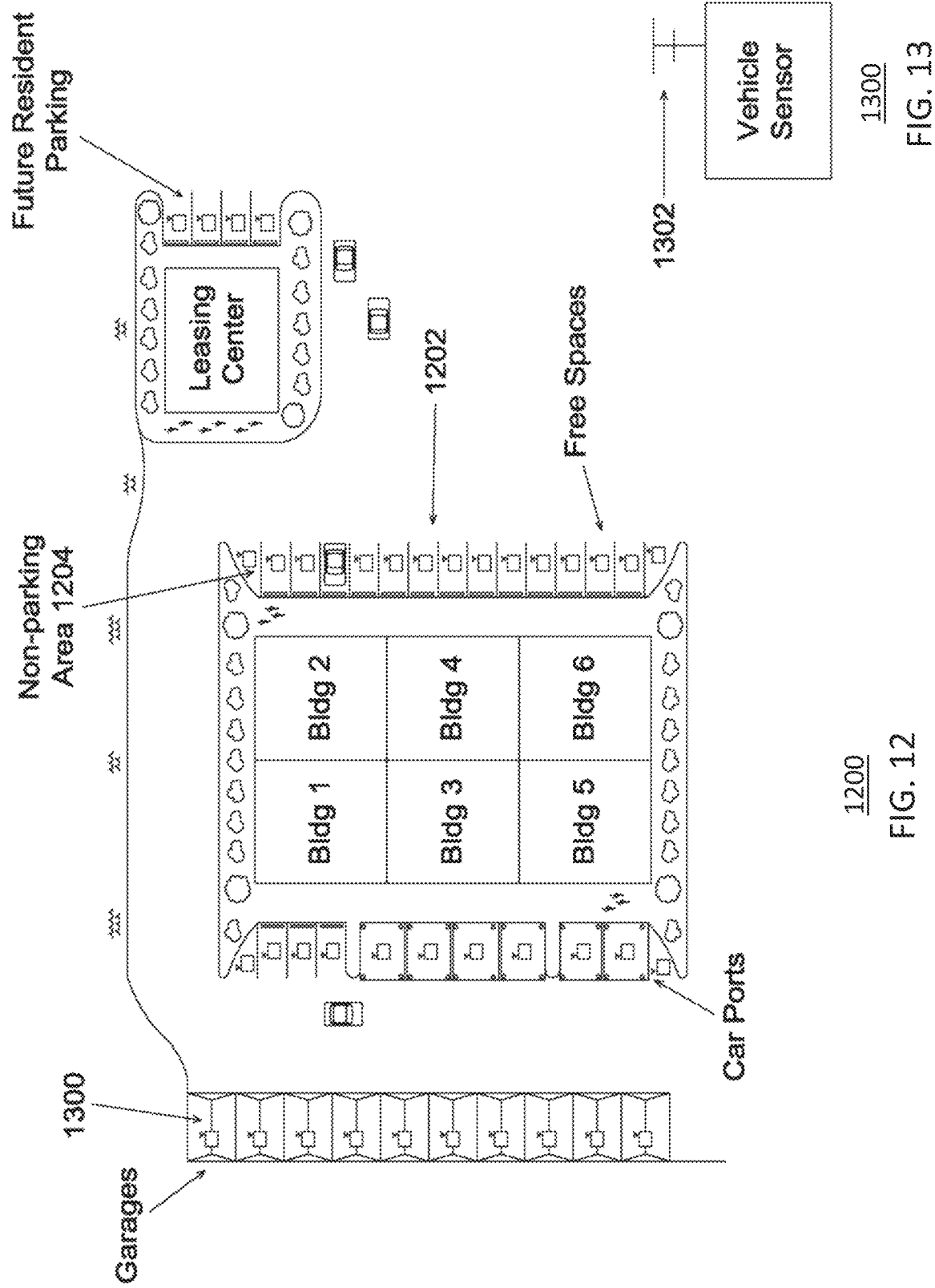

INTELLIGENT PARKING MANAGEMENT SYSTEM AND METHOD

FIELD OF THE INVENTION

The present invention relates generally to parking management systems and methods, and, more particularly, relates to a parking management method and system that effectively and efficiently regulates and manages vehicle parking with a geographic parking area.

BACKGROUND OF THE INVENTION

It is well-known that managing residential parking and enforcing parking violations can be challenging and problematic. More particularly, it can be challenging to manage a limited amount of parking spaces for residents who may desire more parking resources than they currently enjoy. Further, residential communities (e.g., apartment complexes, condo associations, and, for the purposes of this application, commercial lots) typically have a parking policy for its residents, which can be challenging to enforce in an efficient and consistent manner.

One solution for managing residential parking is to provide residents with assigned parking spaces. Residents are typically informed of their assigned parking space(s) after signing their lease agreement. Unfortunately, this solution does not address guest parking. Some residential communities provide parking spaces that are reserved for guests. However, this is not an efficient solution because there is a continuous fluctuation in the amount of guests that require guest parking. For example, during the weekends there may be a need for more guest parking than during the weekdays. Accordingly, assigning a static number of guest parking spaces may, at times, take up more parking spaces than warranted, and, at other times, not be enough to meet guest parking needs. In such situations, it would be desirable to be able to constantly, in real-time monitor the amount of parking spaces that are unoccupied/available.

In addition, there may be situations in which one or more residents may desire additional (or different) parking spaces than assigned to them when they first moved in. One solution is to allow such residents to purchase preferred or additional parking spaces, such as garages or covered parking (i.e., a car port). Unfortunately, managing payments is often left to the leasing office staff, whose time and attention may be better served with other non-parking tasks. Leasing office staff may also be required to manage parking enforcement, resident parking complaints or inquiries, issuing parking permits or decals, etc. Accordingly, it is desirable to provide a system that can manage such parking tasks in order to free up leasing office staff for other non-parking tasks.

Another solution for managing residential parking is to provide parking permits or decals to residents. Such solutions may also provide a controlled gate entry system in which residents are required to show a valid permit or decal (either to a guard or an electronic scanning system) in order to open the gate for entry into the residential community. Unfortunately, managing guest parking can be problematic. Residents may be allowed to "buzz" guests into the gate or provide guests with a guest access code. This can be problematic where one or more residents allow more guest vehicles into the gate than can be supported by the available parking spaces. Another option for guest parking, as discussed above, is a reservation of a static number of guest parking spaces reserved for guests. However, as discussed above, this is not an efficient solution for managing parking spaces because of the constant fluctuation of guests.

Parking policies sometimes require that the parking permits or decals always remain visible so that enforcement patrol persons can distinguish visually between authorized vehicles and unauthorized vehicles. Unfortunately, printing parking permits and decals consumes resources that may be considered wasteful, where other solutions can be implemented that don't require printing paper or stickers. Also, parking permits/decals expire (e.g., when the resident's lease has expired). Continued use of such expired permits/decals may allow unauthorized vehicles to occupy a parking space. Further, parking permits/decals may become lost or damaged. Existing solutions to this issue include residents calling the leasing office and requesting a replacement permit/decal. Leasing office staff may then be required to order replacement permits/decals and provide the resident with a temporary parking permit/decal until the replacement is delivered. This process can be time-consuming for both the property managers and residents. Again, these parking tasks consume leasing office staff resources that could be better utilized in attending to other property-related activities.

In addition, if a resident's vehicle is towed because he/she was unaware that the parking permit/decal was lost or damaged or for some other reason, the resident is likely to feel negatively towards the property owners, which may affect his/her decision to renew the lease. Accordingly, it is desired to provide a system that links resident information with vehicle information and can automatically provide a warning message to residents as a courtesy and to avoid surprise and resentment by residents when their vehicle is towed.

Some property managers of residential communities employ the services of a third-party party parking violation enforcement service, in which a patrol regularly surveys a residential parking lot for visible parking violations. When such patrol discovers a parking violation, they typically immediately contact a tow company to tow the vehicle. Unfortunately, a resident may feel negatively toward the property and potentially seek legal or other reparations if the resident feels that his/her vehicle was towed improperly. Even if the resident recognizes that his/her vehicle was not properly parked, he/she may still feel resentment towards the property owners, or embarrassment if a vehicle owned by his/her guest was towed. Accordingly, it is desirable to provide an intelligent parking management system that is able to manage residential parking according to a residential property's particular parking policy, efficiently and conveniently for both property managers and their residents.

Therefore, it is clear that a need exists to overcome the problems with the prior art as discussed above.

SUMMARY OF THE INVENTION

The invention provides an intelligent parking management system and method that overcomes the hereinaforementioned disadvantages of the heretofore-known devices and methods of this general type.

With the foregoing and other objects in view, there is provided, in accordance with the invention, an intelligent parking management system for residential communities, the system including a license plate reader operably configured to determine a license plate number of a license plate from at least one image of the license plate; and at least one server communicatively coupled to the license plate reader over a network. The server may include a memory storing a parking policy and a plurality of registered license plate numbers for at least one residential community registered with the at least one server and; and at least one processor. The processor may be operably configured to execute programming instructions to access the license plate number received, over the network, from the license plate reader; compare the license plate number to the plurality of registered license plate numbers to determine a licensing plate number incongruousness, the licensing plate number incongruousness generating a parking violation based on the parking policy of the at least one residential community; and communicate, over the network, a parking violation message corresponding to the parking violation to a user.

In accordance with another feature of the present invention, the processor may receive, over the network, a user identification and a user password associated with a resident account from a registered resident of the residential community.

In accordance with another feature of the present invention, the processor is operable to receive, over the network, vehicle identification information associated with a guest vehicle of a guest of the registered resident; and send a denial, over the network, of registration of the guest vehicle with the server as a result of the server determining that the guest vehicle violates at least a portion of the parking policy of the residential community corresponding to the registered resident.

In accordance with yet another feature of the present invention, the parking violation message includes at least one of a tow request, and a warning message to a resident of the residential community registered with the server.

In accordance with yet another feature of the present invention, the processor is operable to determine whether registering a vehicle with the server would exceed a maximum parking lot capacity of the residential community, the maximum parking lot capacity stored at the server.

In accordance with yet another feature, an embodiment of the present invention further includes a plurality of vehicle sensors, each disposed at a plurality of parking spaces associated with a parking lot of the residential community; communicatively coupled to the server, over the network; and operably configured to continuously provide the server a real-time total amount of occupied parking spaces for the residential community.

In accordance with another feature of the present invention, the processor is operable to communicate, over the network, a tow request as a result of the at least one processor determining that the real-time total amount of occupied parking spaces exceeds a total amount of registered vehicles associated with residential community.

In accordance with a further feature, an embodiment of the present invention further includes at least one vehicle sensor disposed at a non-parking area within the parking lot and operably configured to continuously provide the server a real-time indication of whether the non-parking area is occupied by a vehicle; and the processor of the server is further operably configured to execute programming instructions to communicate, over the network, a second parking violation message as a result of the processor determining that the non-parking area within the parking lot is occupied by a vehicle.

In accordance with yet another feature, an embodiment of the present invention further includes a GPS system including a GPS receiver disposed proximate a patrol person, the GPS receiver operably configured to determine a GPS location of the patrol person and the GPS system communicatively coupled to the server and operably configured to transmit the GPS location of the patrol person to the server for non-transitory storage on the memory of the server.

In accordance with a further feature of the present invention, the license plate reader is formed as at least one of: a portable handheld device adapted for portable use by a patrol person patrolling a parking lot associated with at least one residential community, and a patrol vehicle-mounted device.

In accordance with the present invention, a method of managing parking for residential communities, over a network, the method including receiving, by at least one server, from a license plate reader, a license plate number from at least one image of a license plate of a vehicle within a residential parking lot; determining, by the server, whether the license plate number from the license plate reader is associated with a vehicle registered with the server; and communicating, by the server, a parking violation message to a resident mobile device associated, by the server, with the license plate number as a result of a parking violation by the vehicle.

In yet another embodiment, the method further includes receiving, by the server, from each of a plurality of residential communities, a parking policy; creating, by the server, a residential community account for each of the plurality of residential communities; and associating, by the server, the parking policy with the corresponding residential community account.

In accordance with another feature, an embodiment of the present invention also includes receiving, by the server, from a registered resident of at least one of the plurality of residential communities, a user identification and a user password associated with a resident account.

In accordance with yet another feature, the method includes receiving, by the server, from each of a plurality of residential communities, a parking policy; receiving, by the, vehicle identification information associated with a guest vehicle of a guest of the registered resident; and denying, by the server, registration of the guest vehicle with the server as a result of the server determining that the guest vehicle violates at least a portion of the parking policy of the residential community corresponding to the registered resident.

In accordance with yet another feature, an embodiment of the present invention includes, as a result of the server determining that the license plate number from the license plate reader is not associated with a vehicle registered with the server, communicating, by the server, a tow request over a network.

In accordance with yet another feature, an embodiment of the present invention includes continuously providing, by a plurality of vehicle sensors disposed at a plurality of parking spaces within a parking lot, a real-time total amount of occupied parking spaces for a corresponding one of a plurality of residential communities associated with the parking lot.

In accordance with a further feature, an embodiment of the present invention includes communicating, by a GPS system associated with a parking patrol person, to the server, a GPS location of the parking patrol person.

In accordance with another feature, an embodiment of the present invention includes a method of parking management for residents of a residential community over a network, the method including communicating, by a resident of a residential community, to at least one server, resident identification information and vehicle identification information, the vehicle identification information including a license plate number of the resident's vehicle; receiving, by the resident, from the server, a unique user identification and password associated with a resident account on the server, the resident account associated with the resident identification information and the license plate number; and automatically receiving, by the resident, from the server, a parking violation message as a result of a patrol person determining, by a license plate reader, that the license plate number associated the resident account is violating a parking policy of the residential community.

In accordance with a further feature of the present invention, an embodiment of the method further includes communicating, by the resident, to the server, a request to register a guest vehicle with the server, the request including a license plate number associated with the guest vehicle.

In accordance with yet a further feature, an embodiment of the present invention includes automatically receiving, by the resident, from the server, a second parking violation message as a result of at least one of the guest vehicle exceeding a permitted parking time period, and a resident vehicle exceeding a permitted parking time period.

Although the invention is illustrated and described herein as embodied in an intelligent parking management system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of a parking space from a front end to a rear end of the parking space. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 12 is a schematic view of an exemplary residential property with parking spaces and vehicle sensors in accordance with an embodiment of the present invention; and FIG. 13 is a block diagram view of a vehicle sensor of FIG. 12 in accordance with the present invention.

DETAILED DESCRIPTION

Figure 1:
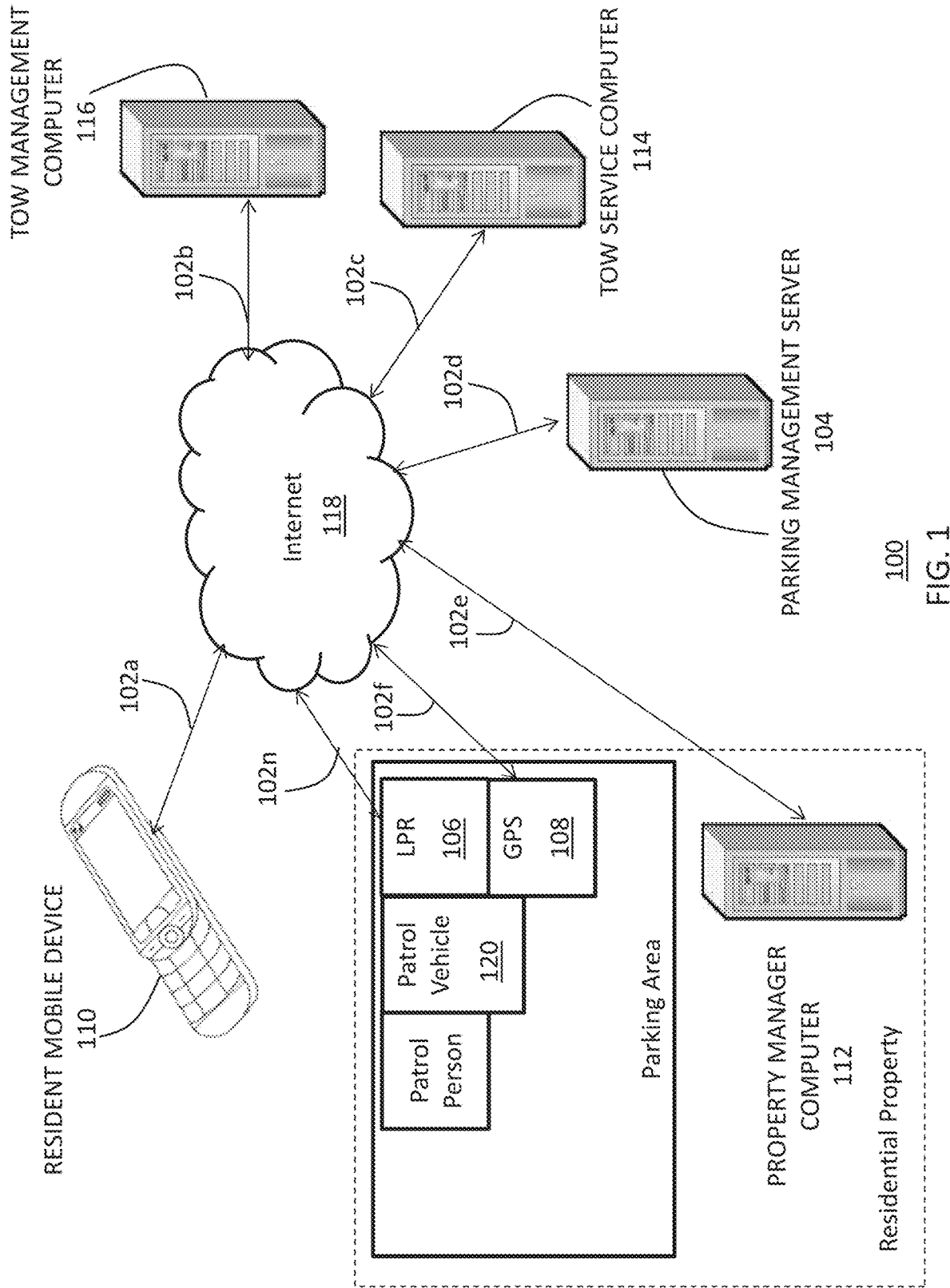
FIG. 1 is a is a block diagram of an exemplary distributed data processing network with a towing service computer, a tow management computer, a parking management server, a mobile electronic device, a residential property computer, a license plate reader (LPR), and a GPS system in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention advantageously provides a novel intelligent parking management system and method that efficiently and effectively regulates, manages, and/or enforces vehicle parking within a geographic parking area. Embodiments of the present invention include an inventive parking management server and license plate reader, communicatively coupled together over a network, which together monitors authorized resident and guest parking by reading license plate numbers and verifying, with the parking management server, that such license plate numbers are currently authorized to park within the geographic parking area. In one embodiment, patrol persons may be employed to patrol the geographic parking area while utilizing the license plate readers to automatically verify authorized vehicles with the parking management server.

In addition, embodiments of the present invention provide a software user interface, accessible over the network, which allows authorized users registered with the parking management server (e.g., property managers and residents) to login to their account to view their parking policy, submit parking-related payments, receive parking-related messages, and manage other parking-related tasks, such as, for example, registering guest vehicles and ordering parking permits.

Further, embodiments of the present invention provide a system of vehicle sensors distributed throughout the geographic parking area, within parking spaces and non-parking areas. The system of vehicle sensors allows the parking management server to continuously receive a current total amount of occupied parking spaces and/or unoccupied parking spaces, thereby monitoring, in real-time, the actual parking capacity of the geographic parking area.

Network

Referring now to FIG. 1, one embodiment of the present invention is shown in a diagram view. FIG. 1 shows several advantageous features of the present invention, but, as will be described below, the invention can be provided in several shapes, sizes, combinations of features and components, and varying numbers and functions of the components. The first example of a network 100 of data processing systems in which the present invention may be implemented, as shown in FIG. 1, includes connections 102a-n, which are the medium used to provide communications links between various devices and computers connected together within the network 100. The connections 102a-n may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In the depicted example, the network 100 includes a parking management server 104. In some embodiments, the parking management server 104 may be considered a server system that includes at least one server computer. In another embodiment, the parking management server 104 may include more than one server computer. Further, the network 100 may include network devices, such as a license plate reader 106, a GPS system 108, a resident mobile device 110, a property management computer 112, a tow service computer 114, and a tow management computer 116, each communicatively coupled to one another and the parking management server 104. The parking management server 104 may receive from, transmit to, and otherwise manage communications between such network devices to efficiently and effectively regulate, manage, monitor, and/or enforce parking-related policies and activities for a plurality of residential communities that are registered with the parking management server 104, as will be described in more detail herein below.

The license plate reader 106 may use image-processing techniques to identify vehicle license plate numbers and upload them to the parking management server 104 for verifying if the license plate numbers are associated with vehicles authorized to park in the residential property parking lot. In one embodiment, a patrol person patrols the parking lot with the license plate reader 106 and may also utilize the GPS system 108 to verify his/her location and a time that the license plate reader 106 captured the license plate number. In one embodiment, the license plate reader 106 may be disposed on/mounted to a patrol vehicle 120. In one embodiment, the license plate reader 106 is formed as a dedicated device. In another embodiment, the license plate reader 106 may be formed as a mobile device, such as, for example, a smart phone or a computer tablet. In such an embodiment, the mobile device's camera may capture images of a license plate number on a parked vehicle's license plate. In a further embodiment, the mobile device may include a dedicated optical scanner. In yet another embodiment, the mobile device's camera may be operably configured to perform as an optical scanner. In a further embodiment, optical character recognition and/or other related software algorithms for determining a license plate number from the captured images may be stored and/or run on the mobile device to extract a license plate number from captured images. In another embodiment, the license plate image may be uploaded to the parking management server 104 and the server 104 may store and/or run the optical character recognition and/or other related software algorithms thereon to determine a license plate number. In yet other embodiments, the license plate reader 106 may be provided in other forms and on other types of devices or systems, as will be described in more detail herein below.

The resident mobile device 110 may be considered a mobile device, such as, for example, a smart phone, cell phone, tablet, etc., owned by or otherwise associated with a resident that allows the resident to access the parking management server 104 over the network 100. The property management computer 112 may be considered a computing device (e.g., personal computer) owned by the property managers and/or located at the leasing office that allows property managers (or employees of the property managers or owners) that may utilize the computer 112 to access the parking management server 104 over the network 100. Similarly, the tow service computer 114 and the tow management computer 116 may be considered computing devices associated with a tow service company and a tow management company, respectively. As used herein, the tow service company may be considered a third-party company that provides towing services to the residential community in response to tow requests. As used herein, the tow management company may be considered a third-party company that is hired by the property manager of the residential community to periodically monitor the parking area to identify parking violations, e.g., external security staff.

In the depicted example, the network 100 can also include the Internet 118, which represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, the network 100 also may be implemented as a number of different types of networks, such as for example, an Intranet, a local area network (LAN), a cellular network, or another wide area network (WAN). FIG. 1 is intended as an example, and not as an architectural limitation for the present invention. In addition, the network 100 may include additional servers and other devices and entities not shown. Further, the network 100 may, in some embodiments, exclude one or more of the network devices depicted in the exemplary embodiment shown in FIG. 1.

Hardware

Figure 2:
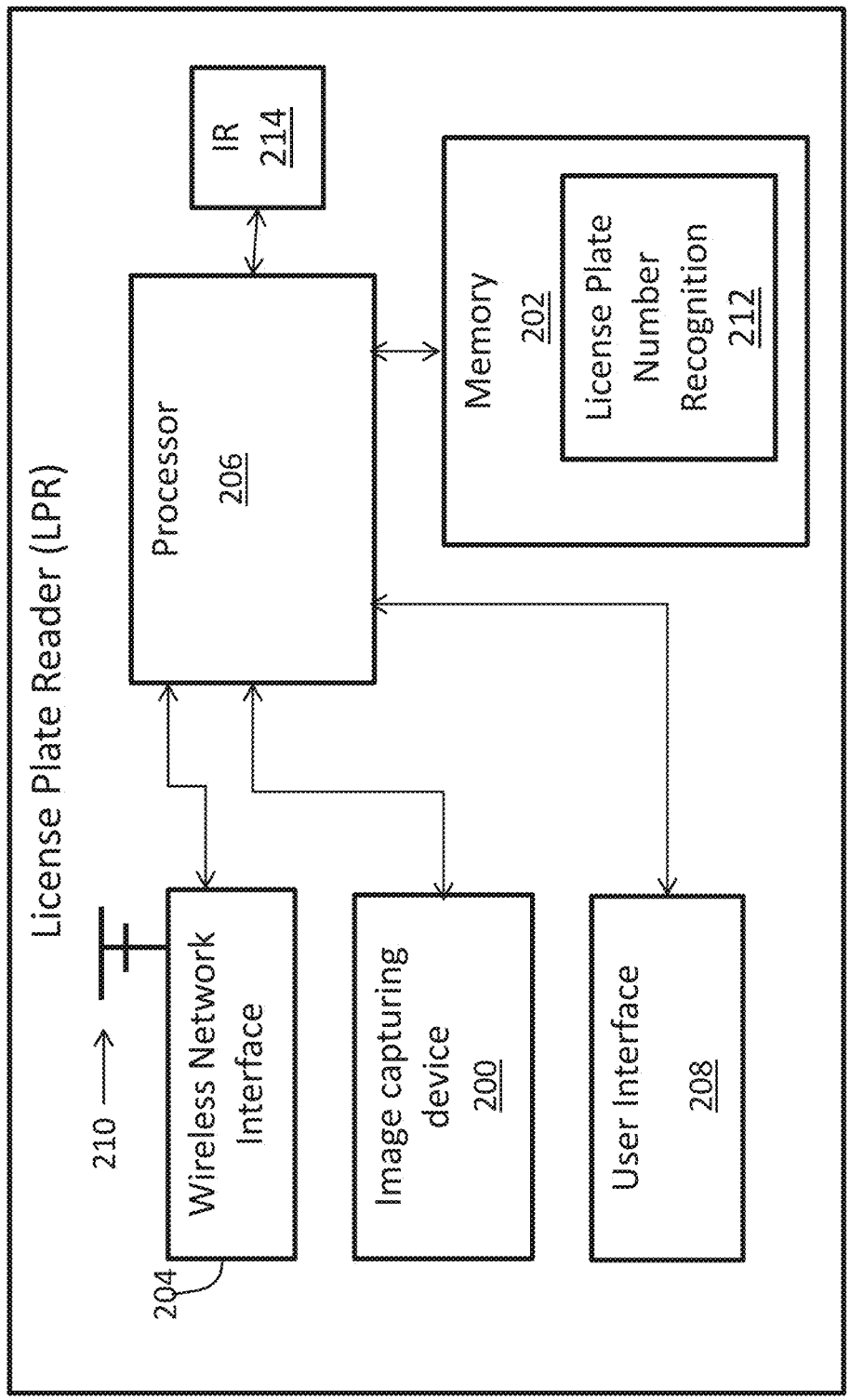
FIG. 2 is a block diagram of an exemplary license plate reader in accordance with the present invention.

Referring now to FIG. 2, with brief reference to FIG. 1, a block diagram view of the exemplary license plate reader 106 is shown, in accordance with one embodiment of the present invention. The license plate reader 106 is operably configured to determine a license plate number of a license plate from at least one image of a license plate, which may be captured by, for example, a patrol person patrolling the parking area of a residential property. As will be explained in more detail herein below, the license plate number may be extracted/determined by the license plate reader 106 from the image, using one or more optical character recognition techniques. Further, the license plate reader 106 may transmit the license plate number to the parking management server 104 to verify whether the vehicle includes a registered license plate number. Accordingly, the license plate reader 106 is considered a specialized hardware device with dedicated hardware and software techniques. The license plate reader 106 incorporates a specialized image capturing device 200 configured for capturing images from which text can be extracted from license plate images, as well as, specialized software techniques for extracting such text. In addition, the license plate reader 106 may provide a dedicated wireless network interface 204 that is configured to communicate specifically, and sometimes exclusively, with the parking management server 104, over the network 100.

In one embodiment, the license plate reader 106 may include the image capturing device 200, a memory 202, the wireless network interface 204, a processor 206, and a user interface 208. The image capturing device 200 may be formed as a camera. The image capturing device 200 can be considered a specialized camera dedicated to capturing license plate images. Non-specialized cameras may not be able to capture images with a sufficient quality and contrast for allowing license plate reader software techniques to extract text from the images. For example, the image capturing device 200 preferably includes infrared illumination 214 so as to be able to capture clear images of license plates during the night with varying levels of ambient light and sometimes harsh environmental conditions.

Some license plates are retroflective, which returns light back to the source, improving the contrast of the image. The image capturing device 200, which is specialized for license plate readers, will preferably utilize infrared illumination 214 to take advantage of this reflective quality to provide images with higher contrast. Accordingly, the license plate reader 106 does not have to rely as heavily on the software algorithms to process the license plate image. In other words, the license plate reader 106 can operate without as much assistance from the software algorithms. For example, the license plate reader 106 may employ multiple license plate number recognition algorithms 212, which may be stored in the memory 202. The license plate number recognition algorithms or software programs 212 may include, for example, software techniques for extracting a license plate number from an image that include: plate location (i.e., finding the license plate on the image); plate orientation and sizing (i.e., compensating for the skew of the plate and adjusting the dimensions to a required size); normalization (i.e., adjusting the brightness and contrast of the image); character segmentation (i.e., locating the individual characters on the plate image); optical character recognition (i.e., conversion or translation of the segmented characters into alphanumeric text); syntactical/geometrical analysis (i.e., verifying text and arrangements against country-specific rules); and averaging results over several images for more reliable results. Filters may also be applied to the images in order to reduce the visual noise on the image. The higher the quality, contrast, and clarity of the license plate image(s) captured by the dedicated image capturing device 200, the lesser the burden on the software techniques to extract text and the more reliable the result. Accordingly, the dedicated image capturing device 200 can improve the functioning of the license plate reader 106. In some embodiments, the license plate reader 106 may also include a proximity sensor to determine a distance between the license plate and the camera lens.

The license plate reader 106 is preferably formed as a portable handheld device adapted for portable use by a patrol person patrolling a parking lot associated with a residential community. In other embodiments, however, the license plate reader 106 (or a second license plate reader) may be provided as a gate control device, where the license plate reader 106 automatically captures license plate images of approaching vehicles and conditions opening the gate upon the license plate reader 106 and server 104 recognizing the license plate number as a registered license plate number. In yet another embodiment, the license plate reader 106 may be formed as a vehicle-mounted reader that is operably configured for mounting on the patrol vehicle 120. As used herein, the term "registered license plate number" is intended to indicate a license plate number that the parking management server 104 has approved for parking in the relevant residential community parking area and whose approval has not expired. Moreover, the parking management server 104 stores registered license plate numbers and when the server 104 receives a license plate number from the license plate reader 106, the server 104 will check the received license plate number against its list of stored, registered license plate numbers for determining whether there is a violation.

The image capturing device 200 preferably includes a relatively high shutter speed so as to avoid blurring of the images captured. Because the image capturing device 200 of the present invention is intended for use on parked vehicles, or very slow moving to stationary vehicles (in an embodiment where the reader 106 is used for gate control), the shutter speed need not be as high as other license plate readers intended for capturing images of moving vehicles.

The memory 202 in the license plate reader 106 is preferably non-transitory memory that is able to store and retain the license plate number recognition software techniques 212 in the memory 202, even after power downs. In one embodiment, all or a portion of the license plate number recognition software programs 212 may be stored in memory on the parking management server 104. The memory 202 may be included in the processor 206 and/or the memory 202 may be separate, but still communicatively coupled to the processor 206, as depicted in FIG. 2. In another embodiment, the license plate reader 106 may also include transitory memory for processing data, such as, RAM.

The wireless network interface 204 may include a radio frequency (RF) communication device 210, such as an RF transmitter, receiver, and/or transceiver, configured to communicate wirelessly over the network 100 with the parking management server 104. In one embodiment, the wireless network interface 204 may include a network interface card, such as a Wi-Fi network interface card, operably configured to communicate with the parking management server 104 over the Internet using a Wi-Fi protocol. Advantageously, this allows the license plate reader 106 to communicate with the parking management server 104 over long distances, via, for example, a Wi-Fi router at a leasing office or other residential community administrative building that is typically located on-site within a WLAN. The wireless network interface 204 is specially programmed to send messages to the parking management server 104 (e.g., license plate numbers) and receive messages from the parking management server 104 (e.g., authorized, non-authorized) over the network 100. Accordingly, the wireless network interface 204 may store a network address for the parking management server 104, such as, for example, an Internet Protocol (IP) address.

In other embodiments, the wireless network interface 204 may communicate over other communication networks using other communication protocols, standards, topologies, etc. For example, the wireless network interface 204 may enable the license plate reader 106 to communicate over a cellular network (e.g., 4G, UMTS, GSM, etc.). Yet other networks that the wireless network interface 204 may provide connection to, include, for example, WiMAX, Bluetooth®, GPS networks, and other wireless networks.

The processor 206 can be, for example, a central processing unit (CPU), a microcontroller, or a microprocessing device, including a "general purpose" microprocessing device or a special purpose microprocessing device. The processor 206 executes code stored in the memory 202 in order to carry out operation/instructions stored in the memory 202, such as the license plate number recognition software techniques 212, as well as, other user input/output commands for the license plate reader 106 (e.g., send to server 104 or display messages on the user interface 208). The processor 206 is preferably a high-speed, durable processor that can be carried around by the patrol person, in sometimes harsh environmental conditions, and used on a daily basis to process images and communicate with the parking management server 104 at high speeds for providing real-time feedback to the patrol person, so that he/she can react quickly and move-on to the next vehicle in the parking area.

The user interface 208 provides users with the functionality to input commands into the license plate reader 106 and also receive feedback/output from the license plate reader 106. The user interface 208 may include inputs such as buttons, menus, keypads, special function keys, navigation keys, pointers, a touchscreen, etc. so as to allow the user (e.g., tow company, resident, property manager, software administrator, and/or computer devices associated therewith) to input commands, such as, for example, power on/off, capture image(s), provide a license plate number, send license plate number to server 104, etc. The user interface 208 may also include output terminals, such as, for example, a display, an audio output/speaker, light indicators, and the like. In particular, the user interface 208 preferably includes an output terminal, such as a display, that would indicate whether a particular license plate captured by the image capturing device 200 includes a registered license plate number, or whether the particular license plate includes a non-registered license plate number, which may prompt the patrol person to act on the violation, such as, for example, issuing a ticket, a warning, or notifying a tow company.

Figure 3:
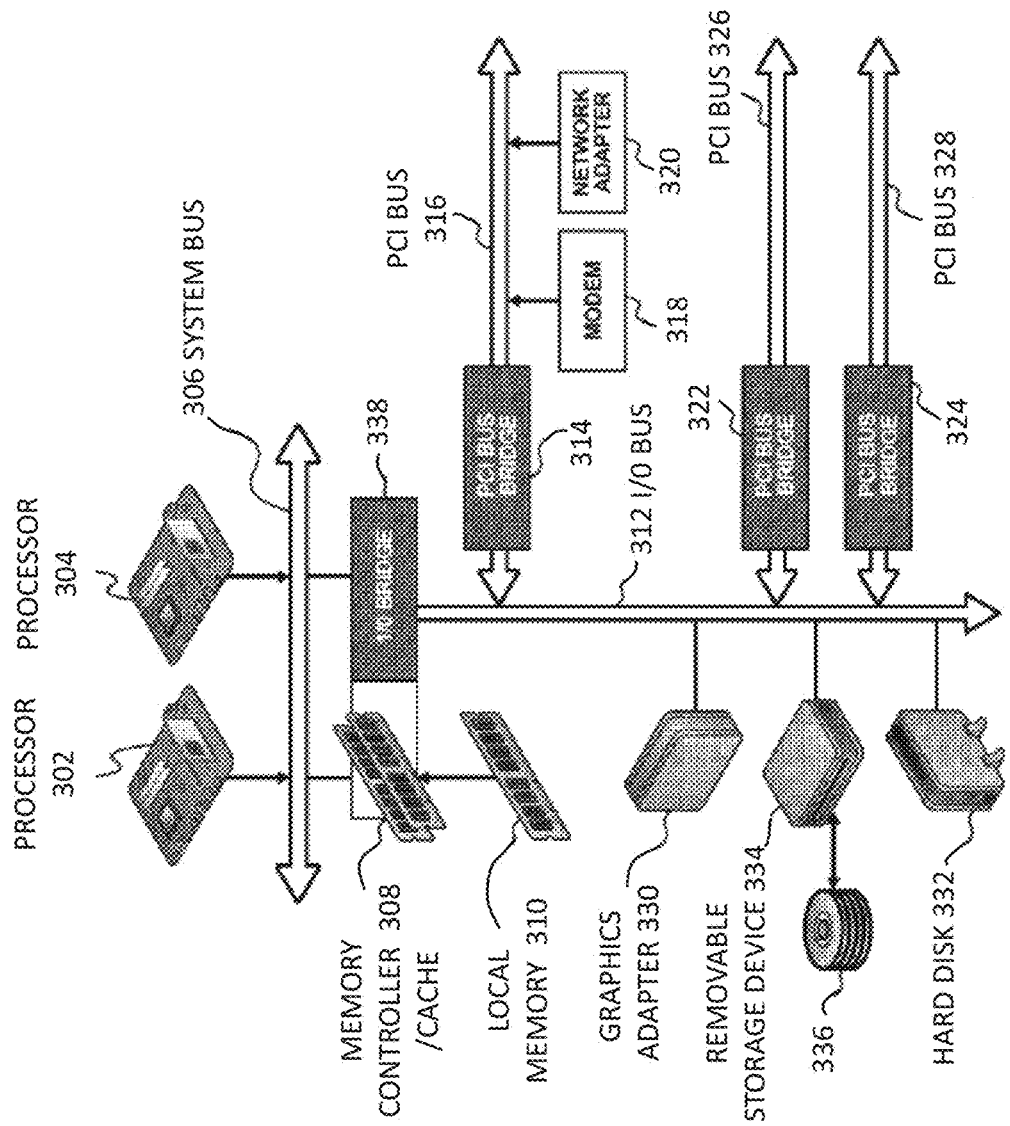
FIG. 3 is a is a block diagram of a data processing system that may be implemented as a network device, such as the parking management server shown in FIG. 1, in accordance with an embodiment of the present invention.

Referring to FIG. 3, a block diagram of a data processing system 300 that may be implemented as a server, such as the server 104, or implemented as a personal computer (PC) associated with a tow service 114 or a tow management company 116, mobile electronic device, or other computing device coupled to the network 100, as shown in FIG. 1, in accordance with one embodiment of the present invention. The data processing system 300 may be a symmetric multiprocessor (SMP) system including a plurality of processors 302 and 304 connected to system bus 306. Alternatively, a single processor system may be employed. Also, connected to system bus 306 is memory controller/cache 308, which provides an interface to local memory 310. An I/O bus bridge 338 is connected to system bus 306 and provides an interface to I/O bus 312. The memory controller/cache 308 and I/O bus bridge 338 may be integrated as depicted. The processor 302 or 304 in conjunction with memory controller 308 controls what data is stored in memory 310. The processor 302 and/or 304 and memory controller 308 can serve as a data counter for counting the rate of data flow to the memory 310 or from the memory 310 and can also count the total volume of data accessed to or from the memory 310. The processor 302 or 304 can also work in conjunction with any other memory device or storage location.

In one embodiment, the memory 310 for the parking management server 104 may store a parking policy for each of a plurality of residential communities registered with the server 104. Accordingly, residents may login to their resident accounts and review their residential community's parking policy at any time. This is particularly useful as most residents do not typically have the parking policy readily available to them and may be required to request the parking policy from the leasing office if they desire to refer to the parking policy for a particular incident. Additionally, the parking management server 104 may utilize the rules in the parking policy to determine what actions to be taken, by the server 104, for residents under said parking policy. For example, one parking policy for a first residential community may not permit a guest to stay longer than 3 days. Accordingly, the server 104 would only allow a guest vehicle to be registered for a maximum of 3 days, after which the guest vehicle would be considered non-registered (restriction or expired) and in violation of the parking policy. As used herein, the term "parking policy" is intended to indicate one or more rules associated with parking in a residential community that may or may not be included in the residential community's contract or lease agreement. The term "parking policy" is also intended to encompass any rules in the residential community's contract or lease agreement that are not expressly associated with parking, but affect parking nonetheless (e.g., a lease term that guests may not stay longer than 3 days may not be considered a term that is expressly associated with parking, yet, as discussed above, such rule indirectly affects parking and therefore may be considered a part of the residential community's "parking policy.").

The peripheral component interconnect (PCI) bus bridge 314 connected to I/O bus 312 provides an interface to PCI local bus 316. A number of modems 318, or wireless cards, may be connected to PCI bus 316. Typical PCI bus implementations will support four PCI expansion slots or add-in connectors. PCI includes, but is not necessarily limited to, PCI-X and PCI Express components. Communications links to the network of computers in FIG. 1 may be provided through the modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, the data processing system 300 allows connections to a multiple network of computers. A graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The processes explained in detail below can be embodied in a computer program. Computer programs (also called computer control logic) are stored in memory such as main memory 310, removable storage drive 334, removable media 336, hard disk 332, and signals. Such computer programs, when executed, enable the computer system to perform the features of the present invention as discussed herein. In particular, the computer programs, when executed, cause the processor 302 and/or 304 to perform all or a portion of the features of embodiments of the present invention.

In this document, the terms "computer program medium," "computer usable medium," and "computer readable medium" are used to generally refer to media such as main memory 310, removable storage drive 334, removable media 336, hard disk 332, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer/programming instructions, between computer systems. Furthermore, the computer readable medium may comprise computer readable information in a transitory state medium such as a network link and/or a network interface, including a wired or wireless network, that allows a computer to read such computer readable information.

Figure 4:
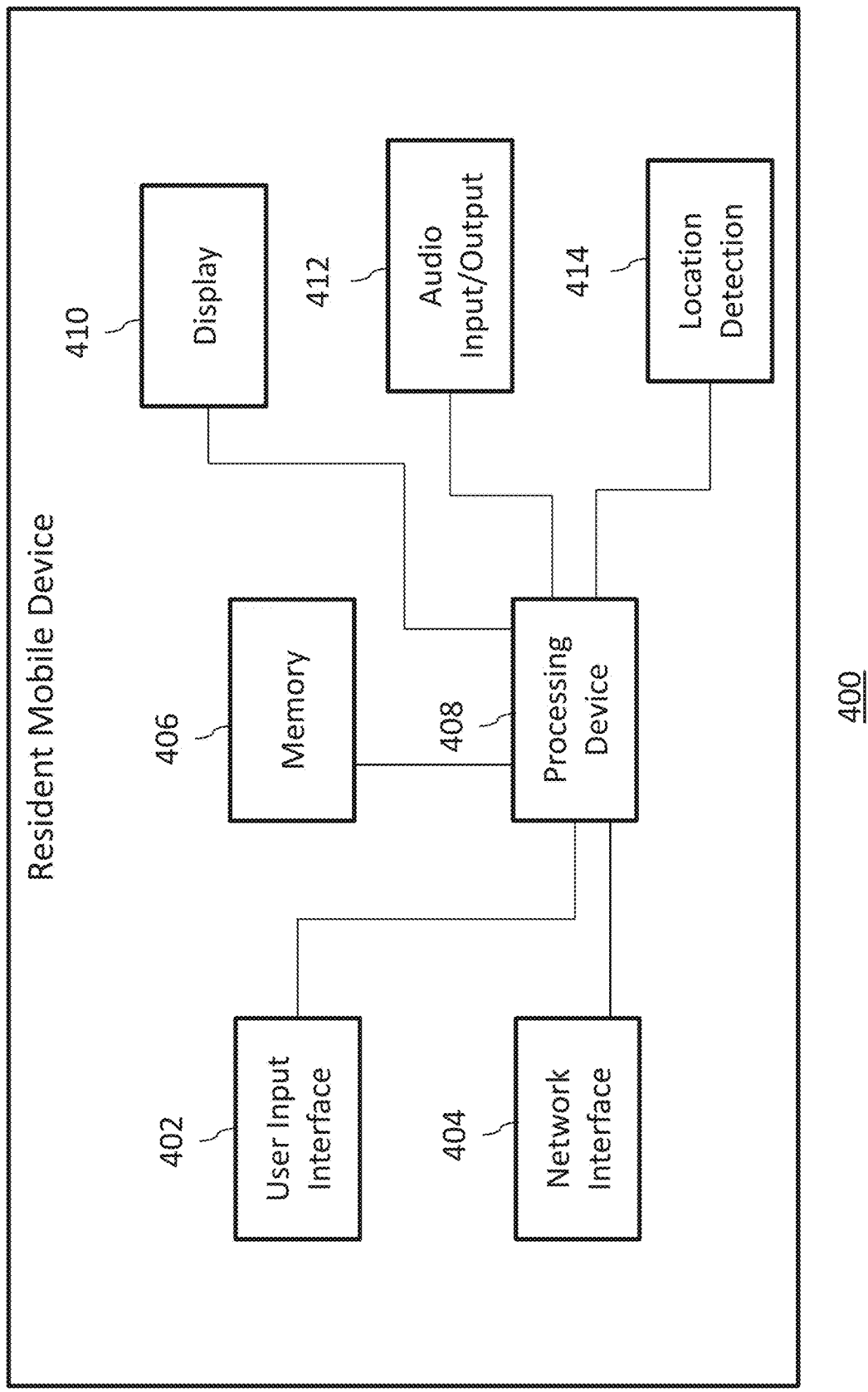
FIG. 4 is a block diagram of an exemplary mobile electronic device as shown in FIG. 1, in accordance with an embodiment of the present invention.
Figure 5:
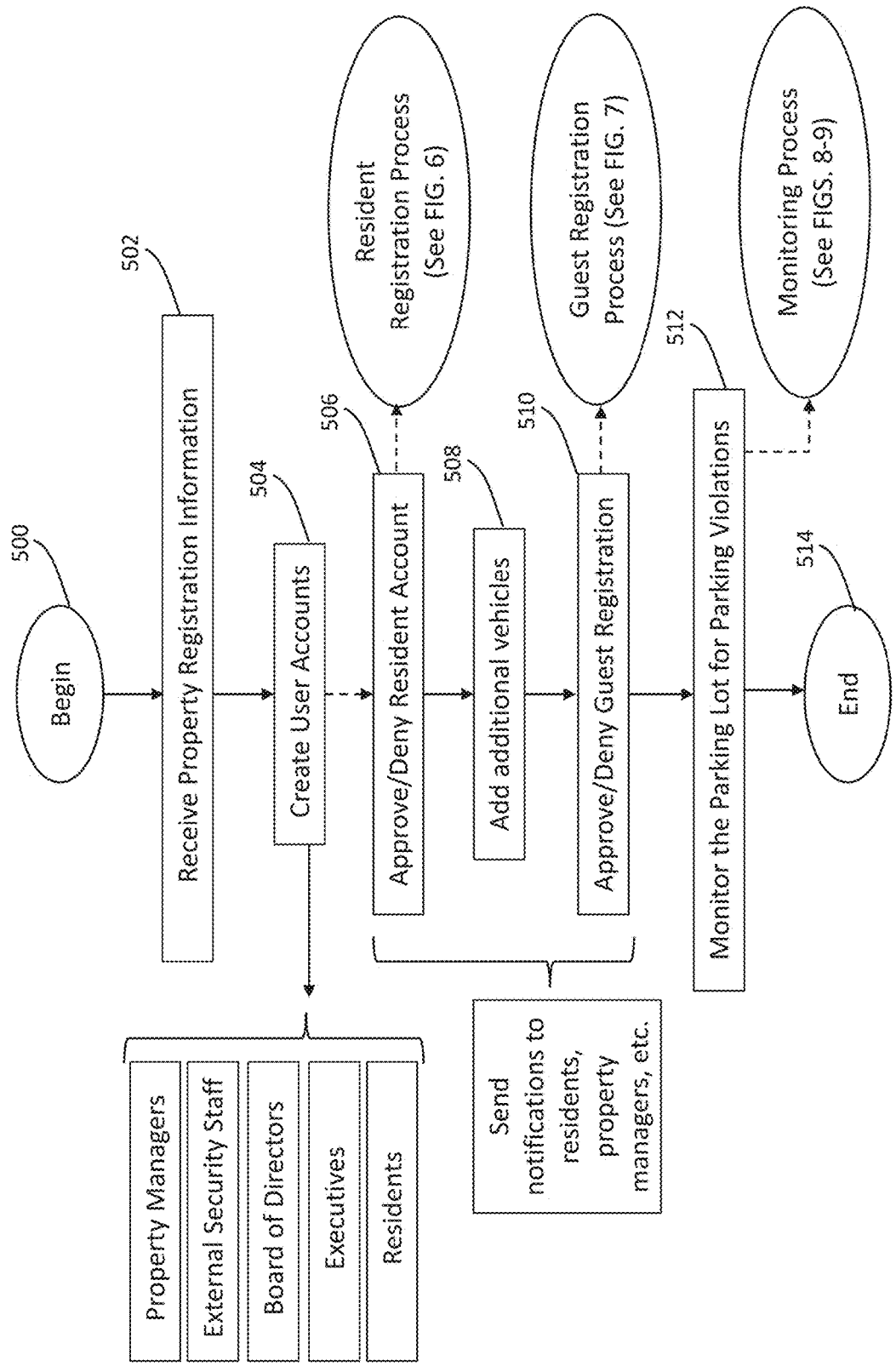
FIG. 5 is a process flow chart representing an exemplary method of managing parking for a residential community over a network in accordance with the present invention.

Referring now to FIG. 4, with brief reference to FIG. 1, an exemplary electronic mobile device 400, such as the resident mobile device 110, is illustrated in a block diagram. The exemplary electronic mobile device 400 includes a user input interface 402, a network interface 404, memory 406, a processing device 408, a display 410, an audio input/output 412, and a location detection device 414.

The user input interface 402 functions to provide a user a method of providing input to the electronic mobile device 400. The user input interface 402 may also facilitate interaction between the user and the device 400. The user input interface 402 may be a keypad providing a variety of user input operations. For example, the keypad may include alphanumeric keys for allowing entry of alphanumeric information (e.g. telephone numbers, contact information, text, etc.). The user input interface 402 may include special function keys (e.g. a camera shutter button, volume control buttons, back buttons, home button, etc.), navigation and select keys, a pointing device, and the like. Keys, buttons, and/or keypads may be implemented as a touchscreen associated with the display 410. The touchscreen may also provide output or feedback to the user, such as haptic feedback or orientation adjustments of the keypad according to sensor signals received by motion detectors, such as an accelerometer, located within the device 400.

The network interfaces 404 may include one or more network interface cards (NIC) or a network controller. In some embodiments, the network interface 404 may include a personal area network (PAN) interface. The PAN interface may provide the capability for the electronic mobile device 400 to network using a short-range communication protocol, for example, a Bluetooth communication protocol. The PAN interface may permit one electronic mobile device 400 to connect wirelessly to another electronic mobile device 400 via a peer-to-peer connection.

The network interfaces 404 may also include a local area network (LAN) interface. The LAN interface may be, for example, an interface to a wireless LAN, such as a Wi-Fi network. In one embodiment, there is a wireless LAN located at or near the residential community (or, more particularly, the leasing office or the resident's residence) that provides the resident mobile device 110 with access to the Internet for receiving the communications from the parking management server 104. The range of the LAN interface may generally exceed the range available via the PAN interface. Typically, a connection between two electronic devices via the LAN interface may involve communication through a network router or other intermediary device.

Additionally, the network interfaces 404 may include the capability to connect to a wide area network (WAN) via a WAN interface. The WAN interface may permit a connection to a cellular mobile communications network. The WAN interface may include communications circuitry, such as an antenna coupled to a radio circuit having a transceiver for transmitting and receiving radio signals via the antenna. The radio circuit may be configured to operate in a mobile communications network, including but not limited to global systems for mobile communications (GSM), code division multiple access (CDMA), wideband CDMA (WCDMA), and the like.

The electronic mobile device 400 may also include a near field communication (NFC) interface. The NFC interface may allow for extremely close range communication at relatively low data rates (e.g., 424 kb/s). The NFC interface may take place via magnetic field induction, allowing the NFC interface to communicate with other NFC interfaces located on other electronic mobile devices 400 or to retrieve information from tags having radio frequency identification (RFID) circuitry. The NFC interface may enable initiation and/or facilitation of data transfer from one electronic mobile device 400 to another electronic device 400 with an extremely close range (e.g. 4 centimeters).

Memory 406 associated with the device 400 may be, for example, one or more buffer, a flash memory, or non-volatile memory, such as random access memory (RAM). The electronic mobile device 400 may also include non-volatile storage. The non-volatile storage may represent any suitable storage medium, such as a hard disk drive or non-volatile memory, such as flash memory.

The processing device 408 can be, for example, a central processing unit (CPU), a microcontroller, or a microprocessing device, including a "general purpose" microprocessing device or a special purpose microprocessing device. The processing device 408 executes code stored in memory 406 in order to carry out operation/instructions of the electronic mobile device 400. The processing device 408 may provide the processing capability to execute an operating system, run various applications, and provide processing for one or more of the techniques described herein. For example, the processing device 408 may run a software application, or "app" associated with the parking management server 104 that allows residents to login to the server 104, access resident account information/documents, send messages to the server 104 (e.g., requesting a guest parking permit), and/or receive notifications from the server 104 (e.g., your vehicle is in violation of the parking policy associated with your account and will be towed within 24 hours if not moved).

The display 410 displays information to the user such as an operating state, time, telephone numbers, various menus, application icons, pull-down menus, and the like. The display 410 may be used to present various images, text, graphics, or videos to the user, such as photographs, mobile television content, Internet webpages, and mobile application interfaces, such as the app associated with the parking management server 104, as discussed above. The display 410 may be any type of suitable display, such as an liquid-crystal display (LCD), a plasma display, a light-emitting diode (LED) display, or the like.

The electronic mobile device 400 may include audio input and output structures 412, such as a microphone for receiving audio signals from a user and/or a speaker for outputting audio data, such as audio alerts, songs, ringtones, video tracks, voice data received by the electronic mobile device 400 over a cellular network, and the like. The electronic mobile device 400 may also include an audio port for connection to peripheral audio input and output structures, such as a headset, or peripheral speakers or microphones.

The location detection device 414 may be associated with a global positioning system (GPS) or other location sensing technologies. The electronic mobile device 400 may have a GPS receiver or the like, to determine the location of the electronic mobile device 400.

The electronic mobile device 400 may also have other components or features that include an accelerometer, a gyroscope, a proximity meter used to detect the proximity of the user to the electronic mobile device 400, an image capturing element configured to capture images and/or videos, an ambient light sensor configured to capture and ascertain lighting conditions, a microphone, or any additional element typically associated with the electronic mobile device 400 such as a phone.

Process

The above-described hardware is useful for implementing embodiments of the present invention, which provide a novel intelligent parking management system and method that efficiently and effectively regulates, manages, and/or enforces vehicle parking within a geographic parking area.

The remaining figures will be described herein below, with brief reference to FIG. 1. In particular, FIGS. 10-14 will be described in conjunction with the process flow charts of FIGS. 5-9. The process flow provides exemplary steps for carrying out an exemplary embodiment of the present invention. The invention, however, is not limited to the number or order of steps shown in FIGS. 5-9. Although FIGS. 5-9 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIGS. 5-9 for the sake of brevity. In some embodiments, some or all of the process steps included in FIGS. 5-9 can be combined into a single process.

The flow starts at step 500 and moves directly to step 502 where the parking management server 104 receives property registration information over the network 100. In one embodiment, the property registration information may be communicated to the server 104 via, for example, email or other electronic communication methods. In one embodiment, the property registration information may include, but is not limited to, the property name, address, manager information, and number of units. As used herein, the term "residential community" is intended to indicate a group of residences commonly associated and that typically share one or more common parking areas, such as, an apartment complex or a condominium. The property registration information may also include contact information for the board of directors for a condo association. In addition, the property registration information may include the residential community's parking policy and preferred tow service company. In other embodiments, the property registration information may include a user selection of parking policy items that are presented to the property manager by the server 104 during the registration process via, for example, a web page with a list of selectable parking policy items. This can be useful for residential communities that do not possess a complete parking policy prior to registration. For the sake of brevity, the term "property manager" will be used hereinafter, but it will be understood that the term may also refer to employees of a property manager, a property owner, a member of a board of directors for a condo association, or other individuals or entities tasked with providing property registration information on behalf of a residential community. In addition, the term "property manager" may also be used to refer to computing devices associated with such individuals or entities.

Parking policy items may include, for example, whether parking permits are required for parking, guest vehicle restrictions, whether vehicles are in violation for parking in fire lanes, displaying "for sale" signs, having expired plates, double parking, parked in loading zones, inoperable vehicles, motorcycle restrictions, future resident parking, etc. Property managers may also indicate actions desired to be taken upon a discovery of a violation, such as, for example, whether to provide a warning message and how many warnings before a tow request is sent to the tow service company, whether and how long of a grace period may be provided to violators, whether there exists a do-not-tow list and what vehicles are on said do-not-tow list, etc.

Such property registration information may be stored on the parking management server 104 and used by the server 104 to establish rules/protocols for how the server 104 handles violations for each registered property.

In step 504, user accounts are created on the server 104 for the residential community/property. Such user accounts may include residential community accounts (e.g., property managers, external security staff, board of director members, executives of the residential community (e.g., district managers), etc.), as well as, resident accounts for the residents of the residential community. The parking policy and other property registration information may be associated by the server 104 with the user accounts of the residential community so that the appropriate information is provided for the user accounts. Each account may have access to different types of information and may have different levels of permission to view and make account changes. For example, property manager accounts may have permissions to edit the parking policy, while the board of director accounts may only have permissions to view the parking policy, but no editing permissions.

Figure 6:
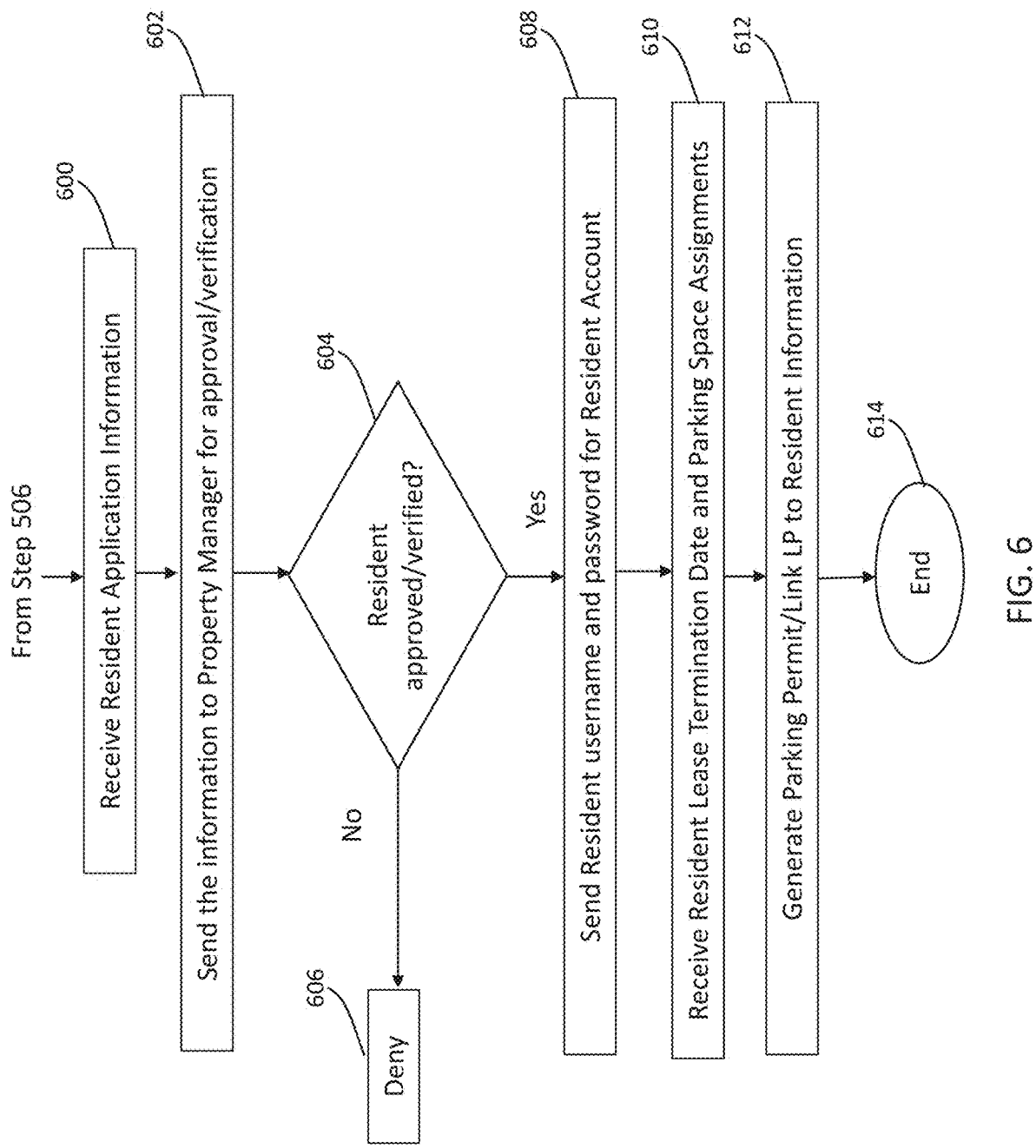
FIG. 6 is a process flow chart representing an exemplary process of linking resident information with a parking permit or license plate number in accordance with an embodiment of the present invention.

After the residential community is registered with the parking management server 104, residents of said residential community may create resident accounts, in step 506. Referring now briefly to FIG. 6, with reference to the screenshot depicted in FIG. 10, an exemplary resident registration process is described, beginning with step 600, where resident application information is received. In one embodiment, the resident may access a website or other software application that provides the resident with access to the server 104 over the network 100. The resident may be presented with a resident application page 1000 in which said resident may be prompted to enter various items of resident information via, for example, data input fields 1002. Although the term "resident" is used, it is understood that the term may also refer to the resident mobile device 110 or 400, or other computing device used by the resident to access the server 104. The resident application information may be used to verify whether the information corresponds to a valid resident of the residential community. The resident information may include, but is not limited to, resident identification information, such as, the resident's name, address, unit number, phone number, email address, and the like. The resident information may also include vehicle identification information, such as the vehicle license plate number, year, make, model, and/or color of the vehicle. The resident may also be presented with, for example, a pull-down menu for the resident to select a residential community from a list of residential communities that are registered with the server 104. This lets the server 104 know which residential community to send the resident application information to for verification and also allows the server 104 to correctly associate/link the resident application information to the relevant residential community records and parking policies. A keyword may be used to identify the correct property for the resident within the registration process. In step 602, the resident application information may be communicated to the property manager of the selected residential community for approval/verification. In one embodiment, the server 104 may automatically send the resident application information to the property manager. In one embodiment, the resident application information may be sent via email to the property manager, as well as, the property manager access account associated with the server 104.

In step 604, the property manager may communicate to the server 104 an indication as to whether the resident is approved/verified. If the answer is "no," the resident application is denied, in step 606, and a resident account is not created or linked to the residential community. If the answer is "yes," the resident application is approved and, in step 608, a resident account is created on the server 104 and a resident username and password sent to the resident for his/her account. The username may be considered a unique user identification for the resident. In one embodiment, the resident may be allowed to change his/her username and password. As used herein, the term "registered resident" is intended to indicate a user/resident that has been approved for parking in the relevant residential community (and whose approval has not expired) and whose resident account information is stored on and recognized by the parking management server 104 as having resident parking privileges.

In step 610, the parking management server 104 may receive, from the property manager, the resident's lease termination date and parking space assignments. The parking management server 104 may also receive, from the property manager, additional information relevant to the resident's parking criteria, such as, for example, the maximum number of vehicles authorized for the resident, the resident's purchase of a garage, or inclusion of the resident's vehicle on the do-not-tow list, if, for example, the resident is also an employee of the residential community. The server 104 may also allow the property manager to view real-time guest vehicle reports, send messages to individual residents, or the entire property, and/or view all user's login information.

In general, the parking management server 104 may manage a multitude of parking-related tasks by allowing residents to sign into their resident accounts, submit requests, make payments, etc. and process the requests autonomously according to rules pre-determined by the property managers. This alleviates the property managers from having to be involved in processing these tasks. Additionally, the parking management server 104 can perform some tasks that cannot be performed manually by an individual, such as constantly monitoring parking spaces, automatically sending messages, and verifying, in real-time, whether parked vehicles are registered and authorized to park. Additionally, the parking management server 104 can perform such tasks for a multitude of residential communities, each having different parking policies and different parking needs. In some embodiments, the parking management server 104 may be operable to manage other non-parking related tasks, such as, for example, managing maintenance/repair tasks. In other embodiments, the server 104 may allow residents to submit maintenance request tickets, pay rent, pay HOA fees, and allow third-party vendors to submit bids to be opened by the HOA or board of directors' committee.

In step 612, the parking management server 104 may generate a parking permit for the resident and/or may associate or link the resident vehicle's license plate number to the resident account information. By associating the resident vehicle's license plate number with the resident account information, the server 104 can determine which resident's contact information a warning message, for example, can be sent to if the patrol person detects a license plate number with the license plate reader 106 that is associated with a vehicle violating one of the parking policy items. In other words, when the server 104 receives a license plate number or a parking permit number, the server 104 can determine which resident is in violation of the parking policy. The server 104 can also perform other checks, such as whether the license plate number is on the do-not-tow list, or whether the resident has previously violated the parking policy. The parking management server 104 may provide the parking permit/decal on the resident's computing device that the resident can print out, and/or, the parking management server 104 may mail the parking permit/decal directly to the residents address or to the property manager for pick-up by the resident. In one embodiment, the resident may position the parking permit/decal on the resident's vehicle. In another embodiment, the server 104 may utilize other permit systems, such as, for example, an ePermit system. In another embodiment, the residential community may forego permits/decals and, instead, utilize the license plate reader 106 and license plate numbers to monitor and enforce its parking policy, as will be described in more detail herein below. Advantageously, time and resources may be saved by foregoing permits and decals. The resident registration process may end at step 614.

Referring now again to FIG. 5, after the resident account is approved and created on the server 104, additional vehicles may be added to the resident account, in step 508, via the network 100, and parking permits/decals generated for such additional vehicles, or, alternatively, additional license plate numbers input and associated with the resident account, via the network 100.

Figure 7:
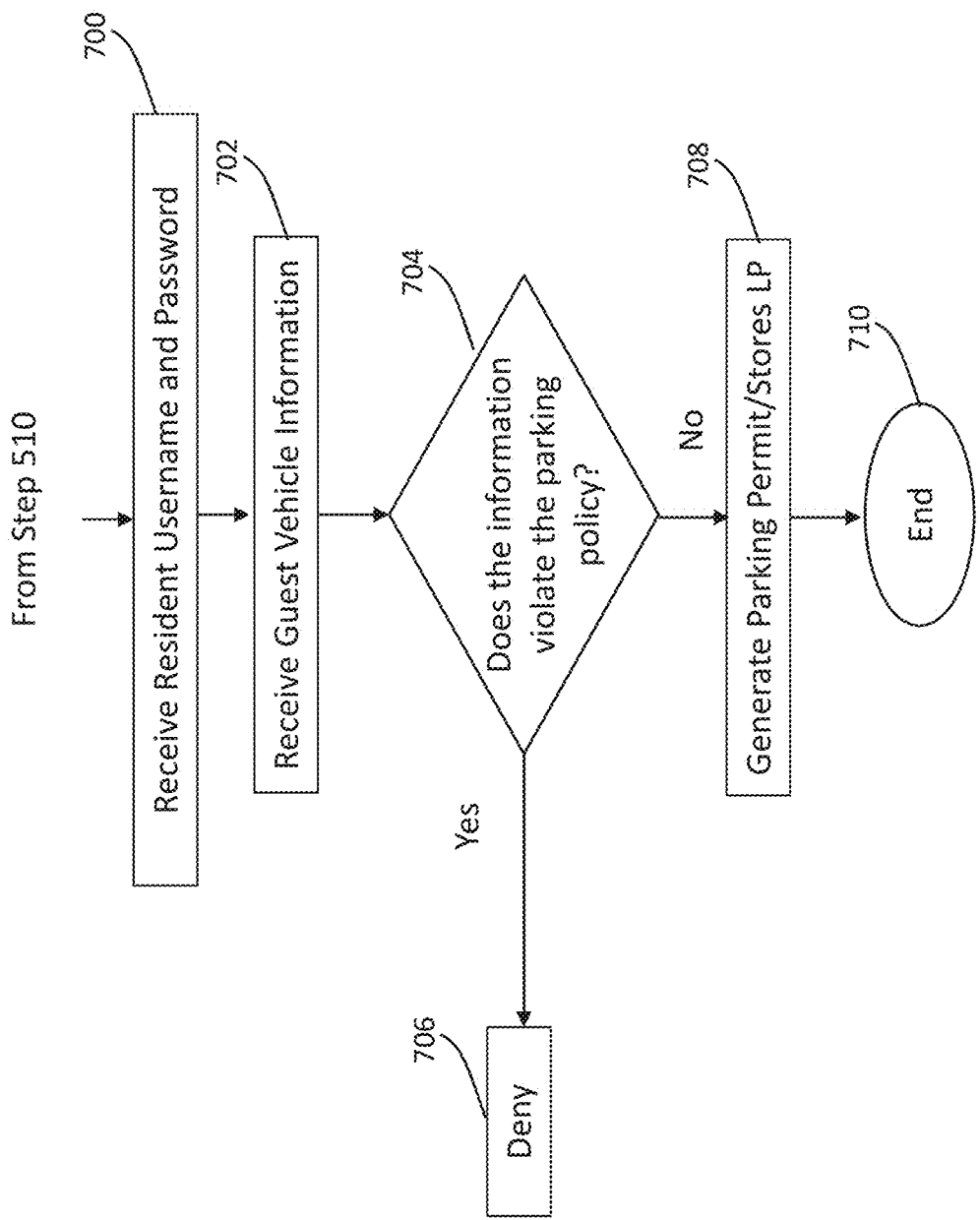
FIG. 7 is a process flow chart representing an exemplary process of registering a guest vehicle in accordance with an embodiment of the present invention.

In step 510, the resident may input a guest registration application. Referring now briefly to FIG. 7, with reference to the screenshot depicted in FIG. 11, an exemplary guest registration process is described, beginning with step 700, where the resident may login to his/her resident account on the parking management server 104. The resident may access his/her resident account via a resident login webpage 1100. The resident may input his/her unique user identification and user password in, for example, username and password input fields 1102 on the webpage 1100. In one embodiment, the webpage 1100 may allow the resident to receive or reset his/her username and password through an email account associated with the resident account. After the resident logs in to his/her resident account, the resident may perform a variety of activities associated with his/her account, such as view the residential community's parking policy. In particular, the resident may input guest vehicle information, in step 702. The guest vehicle information may include vehicle identification information, such as, for example, the guest vehicle license plate number, year, make, model, and/or color of the guest vehicle. The guest vehicle information may also include guest identification information, such as, for example, the name and contact information (email address, phone number, etc.) of the guest. Information in the guest application may also include, for example, the number of days that the guest is requesting for parking, the dates that the guest is requesting, and the number of vehicles that the guest is requesting parking privileges for. In one embodiment, the software interface for access to the resident account maybe formed as a software mobile application ("app") that is configured to run on a mobile device, such as, the mobile device 400. Advantageously, the resident may access his/her resident account conveniently on the resident's mobile device 400.

In step 704, the parking management server 104 determines whether the guest information violates at least a portion of the residential community's parking policy and guest restrictions. Stated another way, the parking management server 104 determines whether the guest information satisfies the residential community's parking policy and other related guest restrictions. In one embodiment, the parking management server 104 may verify whether the number of days that the guest is requesting for parking falls within the maximum number of days that a guest is allowed to visit a resident. For example, if a lease agreement restricts guest visitation to 7 days, and the guest requests parking privileges for 10 days, the parking management server 104 may deny the guest application. Alternatively, the parking management server 104 may issue a parking permit valid for only 7 days. In another embodiment, the parking management server 104 may store a maximum capacity for a parking lot, which may have been received by the residential community during the property registration process. Accordingly, the parking management server 104 may determine whether registering the guest vehicle with the server 104 would exceed the maximum parking lot capacity of the residential community and condition registration of the guest vehicle on not exceeding the capacity. This may be particularly useful during the holidays or other times where it is expected that a large number of guests may be visiting residents. In another embodiment, the parking management server 104 may continuously monitor the actual number of parking spaces occupied in real-time and condition guest vehicle registration on whether such real-time parking lot capacity would be exceeded. This embodiment will be described in more detail herein below with reference to FIGS. 12-13. As another example, the server 104 may verify whether the number of guest vehicle registrations requested exceeds the maximum number of guests permitted per resident at one time. For example, the residential community's parking policy may limit the number of guest vehicles to 2 at one time. Accordingly, the parking management server 104 may deny guest vehicle applications that request more than 2 guest vehicles. It is understood that the number and type of guest vehicle restrictions and parking policy items can be numerous and vary greatly from one residential community to another. What is important is that the parking management server 104 will store such rules and automatically condition registration of vehicles with the server 104 on applications that meet the rules, for all vehicle registration applications, or other parking-related requests or inquiries.

If the guest vehicle information violates the parking policy, the process proceeds to step 706 where the guest application is denied by the parking management server 104. Such denial may be sent, by the server 104, to the resident and/or guest. On the other hand, if the parking management server 104 determines that the guest vehicle application does not violate the residential community's parking policy and/or does not exceed the maximum parking lot capacity, the process proceeds to step 708, where the parking management server 104 approves the guest application, register's the guest vehicle with the parking management server 104, generates a parking permit/decal, and/or stores the license plate number of the guest vehicle with the server 104. It is understood that a "registered vehicle" is understood to mean that the server 104 stores the vehicle's information (e.g., permit number, decal number, and/or license plate number) and has such vehicle information associated with a resident account, so that during monitoring of vehicles in the parking lot by, for example, patrol persons with license plate readers 106, the server 104 can determine whether vehicles parked in the parking lot are authorized and where to send any parking violation warning messages (e.g., resident's email address). It is also understood that storing information, such as the license plate number or parking policy, with or at the server 104 is also intended to encompass storing such information on a database associated with and communicatively coupled to the server 104.

Once a guest vehicle is registered with the server 104, the server 104 may also send a message over the network 100 to the resident and/or guest notifying them that the vehicle is registered. In a further embodiment, the server 104 may send the resident or guest the parking permit over the network 100 (in a printable form, such as, a pdf), or in the mail. Advantageously, residential communities can monitor and control guest parking and residents can obtain guest parking permits or permissions by simply logging in to their resident account over the network 100 and submitting an application.

In another embodiment, the parking management server 104 may allow guests to send a guest registration application to the server 104, via, for example, a guest application webpage. In such an embodiment, the guest may input resident identification information, such as, for example, the resident's name and address, which can allow the server 104 to associate the guest's application information with the relevant resident account. After the guest is approved for registration with the server 104, the server 104 may send the guest a copy of the residential community's parking policy to the guest's email address. In one embodiment, notifications of any vehicles approved for registration with the server 104 are sent, over the network 100, to the property manager. In another embodiment, the property manager's account may have access to a listing of all registered vehicles (resident and guest vehicles) that can be viewed by the property manager upon logging into his/her account. In one embodiment, property manager accounts may be provided with the ability to override parking permissions established by the server 104 and expressly deny or approve vehicles, or add vehicles to the do-not-tow list. The guest vehicle registration process may end at step 710.

Figure 8:
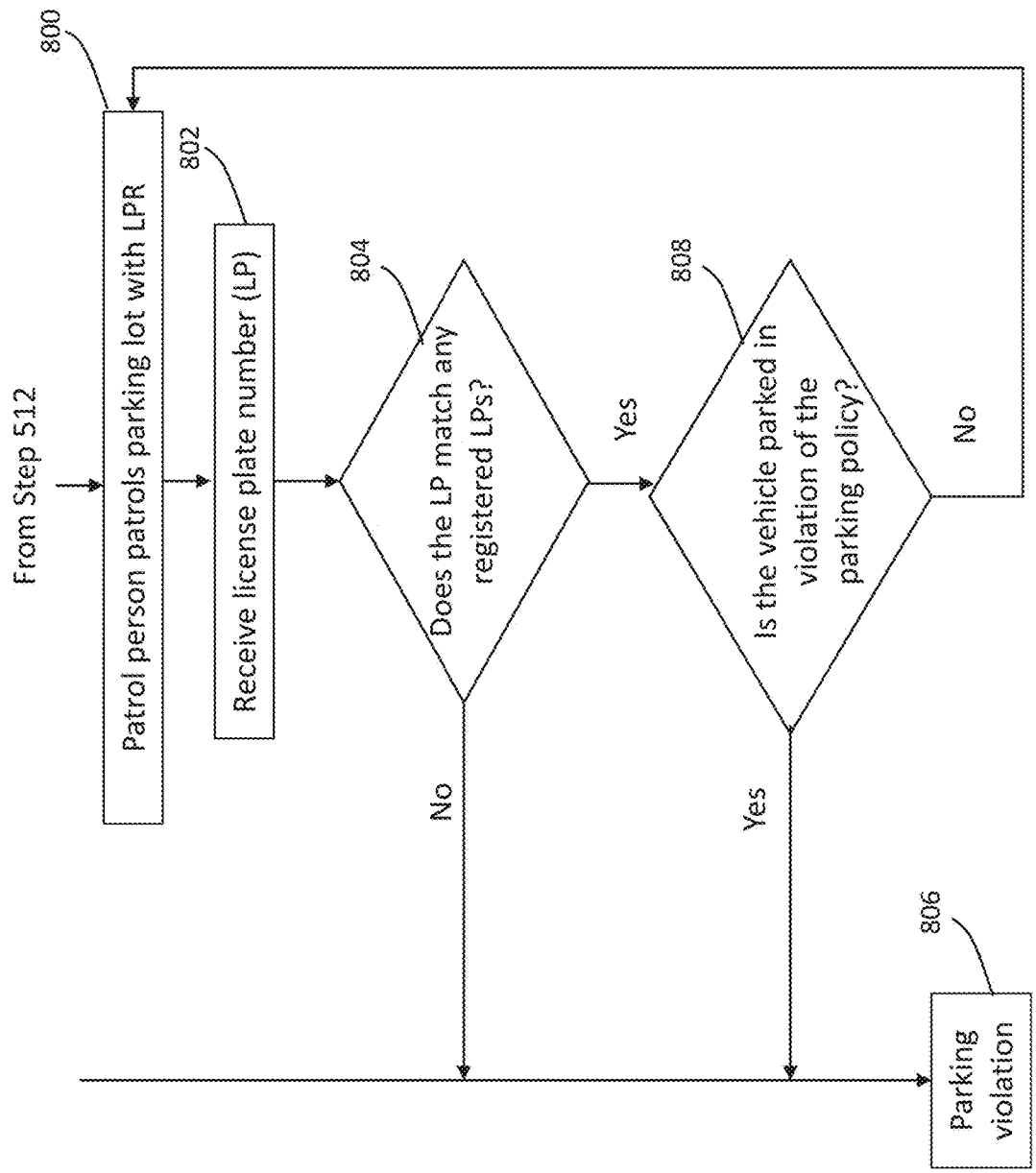
FIG. 8 is a process flow chart representing an exemplary process of monitoring a residential parking lot with license plate numbers in accordance with an embodiment of the present invention.

Referring again briefly to FIG. 5, in step 512, the parking lot may be monitored for parking violations. As used herein, the term "parking lot" is defined broadly to mean an area intended for parking vehicles. Referring now to FIG. 8, with reference to FIG. 1, an exemplary parking lot monitoring process is described for monitoring with the license plate reader 106, beginning with step 800, where a patrol person may patrol a parking lot with the license plate reader 106. In one embodiment, the patrol person may patrol the parking lot periodically on foot and/or in the parking patrol vehicle 120. The license plate reader 106 may be formed as a portable handheld device that the patrol person can aim at vehicle license plates in order to extract a license plate number therefrom, as explained above with reference to FIG. 2. In one embodiment, the owner or manager of the parking management server 104 may also employ the patrol persons.

In one embodiment, the GPS system 108 disposed proximate the patrol person may be operably configured to determine, via a GPS receiver, a GPS location of the patrol person. The GPS system 108 may be integrated into the patrol vehicle 120, or may be included in the license plate reader 106. In one embodiment, the GPS system 108 may be communicatively coupled to the server 104 and operably configured to transmit the GPS location of the patrol person to the server 104 for storage. Such GPS locations and time stamps may be used to provide proof that the patrol person was at the parking lot when the parking violation occurred.

In step 802, the parking management server 104 accesses the license plate number, received by the server over the network, from the license plate reader. Said another way, the license plate number may be stored on the server 104, or with another server communicatively with said server 104, such that the processor has access to said number. In step 804, the parking management server 104 may compare the received license plate number with a plurality of registered license plate numbers stored at the server 104 in order to determine whether the license plate number matches any of the registered license plate numbers. Said another way, the parking management server 104 compares the license plate number to the plurality of registered license plate numbers to determine a licensing plate number incongruousness, i.e., when the license plate number received by the license plate reader does not correspond or match up with one or more of registered license plate numbers. The licensing plate number incongruousness may generate a parking violation based on the parking policy of the at least one residential community. Utilizing the parking policy of the particular residential community to dictate the parking violation may be autonomous, or performed without user intervention after initial input of the guidelines for the particular parking policy, or may be dictated with facilitation of a user, after initial input of the guidelines.

With regard to whether the licensing plate matches the registered licensing plate, if the answer is "no," and the license plate number does not match any of the registered license plate numbers, the process proceeds to step 806, where the server 104 determines that a parking violation has occurred. In one embodiment, the server 104 may communicate, over the network 100, a parking violation message as a result of determining that the license plate number does not match any of the registered license plate numbers. The parking violation is preferably communicated to a resident user. In other embodiments, however, the parking violation message may be communicated to a tow company, wherein the message consists of a tow request to the tow service company 114. The tow request may be an email, a phone call, a text message or other communication to the tow service company 114 that a tow is requested. The tow request may include the license plate number of the vehicle to be towed and a name and/or address of the residential community from which the vehicle should be towed.

In another embodiment, the parking violation message may include a warning message to a resident whose resident account is associated with the license plate number. For example, the vehicle parking permissions have expired due to the resident's lease expiring or the guest's parking privileges expiring. Stated another way, upon detection by the server 104 that a parked guest vehicle's permitted parking time period has expired or a parked resident vehicle's permitted parking time period has been exceeded, the server 104 may automatically send the resident a warning parking violation message. The server 104 may store this warning event and upon a subsequent violation, automatically send a tow request to the tow service company 114, without a second warning message. It is understood that various actions may be taken by the server 104 as a result of the server 104 detecting a parking violation (e.g., implementing a 10-day grace period, providing a limited number of warning messaging prior to towing, automatically towing without a warning message, checking a do-not-tow list prior to sending a tow request, placing a vehicle boot on the vehicle wheel, etc.). Advantageously, the server 104 can manage and implement parking policy rules set by each residential community during, or after the residential community's registration with the server 104. The server 104 can also store a history of violations associated with a resident account and also manage and implement any special parking privileges associated with a resident account (e.g., do-not-tow list, paid-for parking garages, call before tow privileges, etc.). The warning message may be sent over the network 100 to the resident by email, text, phone call, or other communication method. In another embodiment, warning messages may also be sent to the property manager.

If the answer is "yes," and the license plate number does match one of the registered license plate numbers, the process proceeds to step 808, where the parking management server 104 may determine whether the vehicle, though registered, may be violating the parking policy in some other manner that the server 104 is configured to check for. For example, the vehicle may be parked illegally in a grass area, in a new resident only parking area, or in a parking space not assigned to the resident. If the answer is "yes," and the vehicle is parked in violation of the parking policy, the process may proceed to step 806, where the server 104 determines that a parking violation has occurred. In one embodiment, the server 104 may communicate, over the network 100, a parking violation message as a result of determining that a parking violation has occurred. In one embodiment, the parking violation message may be a tow request to the tow service company 114. The tow request may be an email, a phone call, a text message or other communication to the tow service company 114 that a tow is requested. The tow request may include the license plate number of the vehicle to be towed and a name and/or address of the residential community from which the vehicle should be towed. Such parking violation message may be communicated to the server 104, over the network 100, by the patrol person and/or the license plate reader 106. In one embodiment, the license plate reader 106 may include a menu that can allow the patrol person to select from a group of pre-programmed parking violations. If selected by the patrol person on the license plate reader 106, the selected parking violation may be sent over the network 100 to the server 104. The server 104 may be programmed to perform different actions depending on the particular parking violation. For example, if there is a parking violation because the resident's lease has expired, the server 104 may send a warning message, but provide a 2-day grace period prior to submitting a tow request. In one embodiment, the server 104 may be configured to provide a 10-day grace period for unpurchased parking permits, vehicle information changes, and renewal parking permits. Alternatively, if there is a parking violation because the vehicle is double parked or otherwise parked so as to block other vehicles, the server 104 may be configured to automatically send a tow request.

If the answer is "no," and the vehicle is not in violation of any other parking policies or rules, the process may return to step 800, where the patrol person continues to patrol the parking lot with the license plate reader 106 by, for example, scanning a subsequent parked vehicle.

Figure 9:
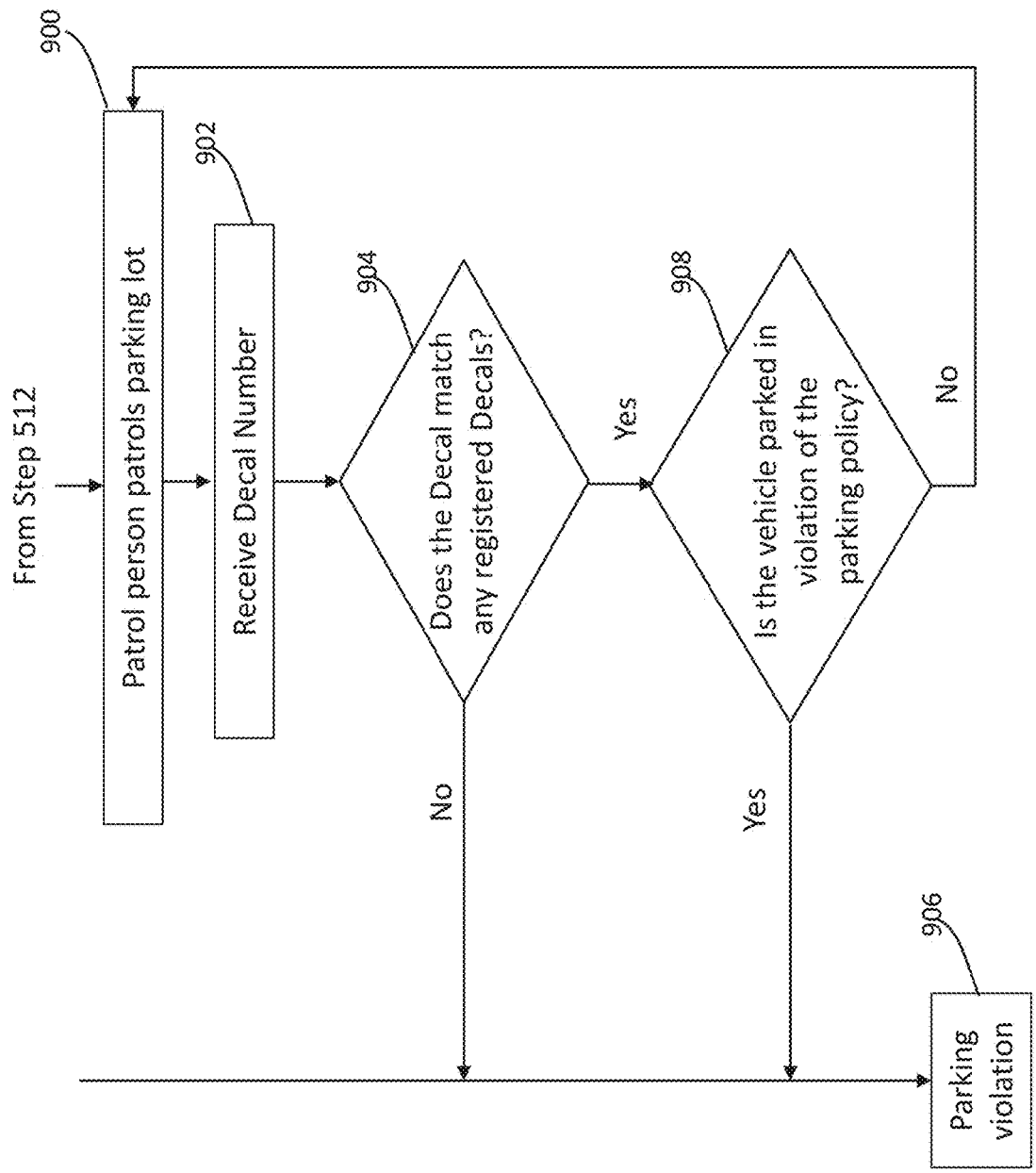
FIG. 9 is a process flow chart representing an exemplary process of monitoring a residential parking lot with decals in accordance with an embodiment of the present invention.
Figure 10:
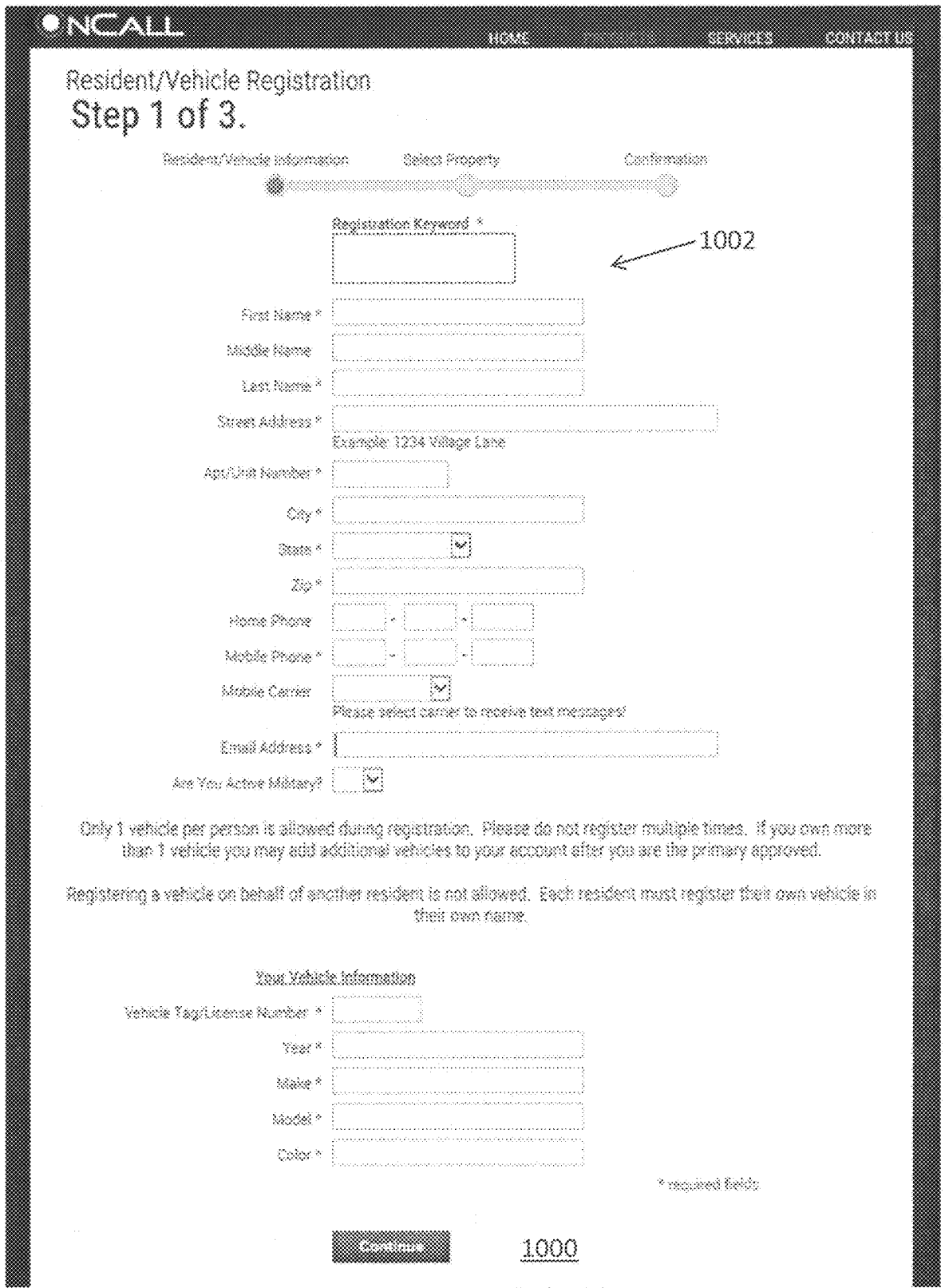
FIG. 10 is a screenshot of an exemplary software application at least partially implementing the inventive process, the screenshot depicting a resident registration screen on a resident's electronic device in accordance with an embodiment of the present invention.
Figure 11:
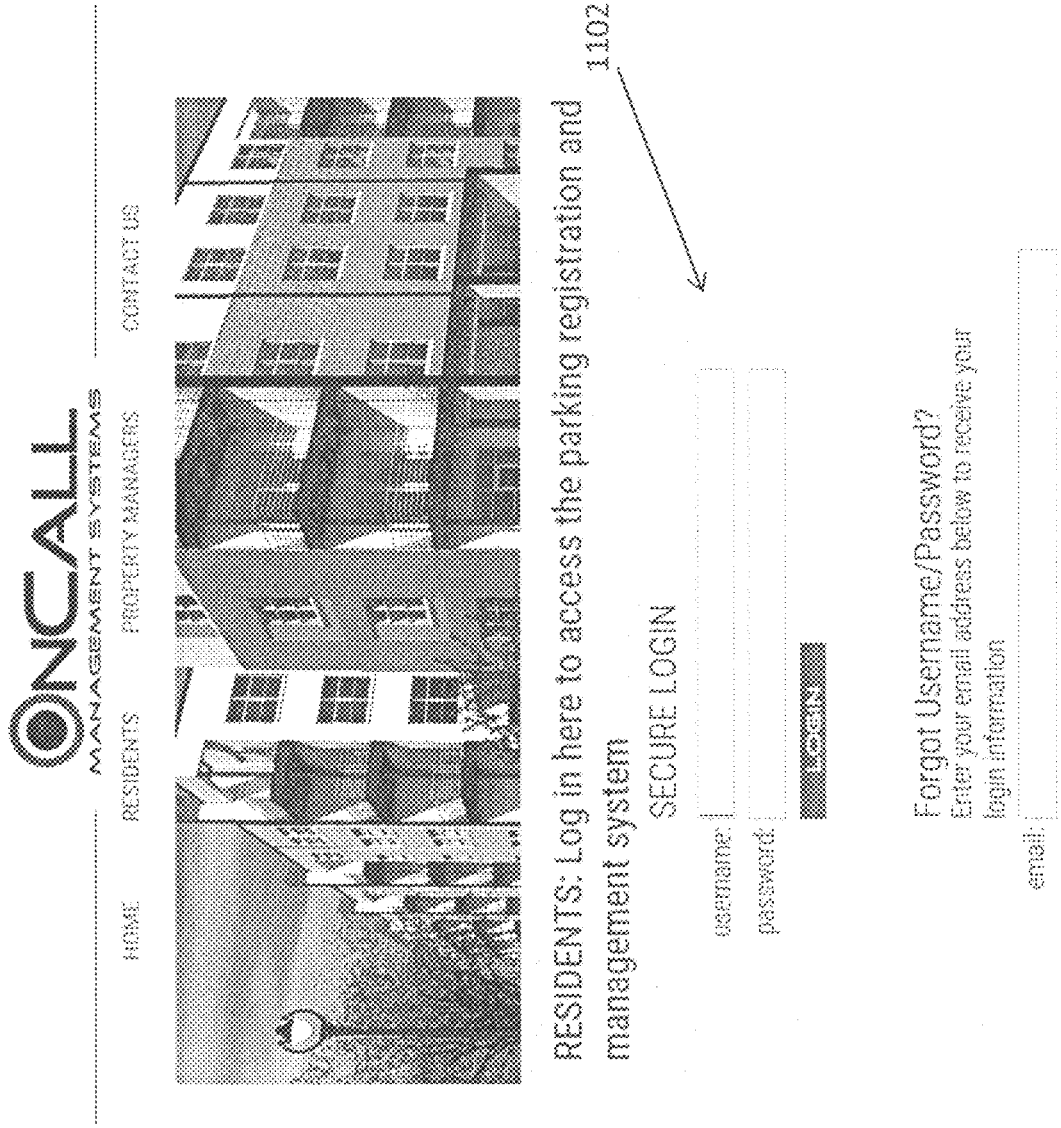
FIG. 11 is a screenshot from the exemplary software application of FIG. 10 depicting a resident interface displaying a resident account log-in page in accordance with an embodiment of the present invention.

Referring now to FIG. 9, an alternative parking lot monitoring process is described, with brief reference to FIG. 1, in which parking decal numbers are stored by the server 104 and associated with resident accounts. In one embodiment, the parking policy requires that parking decals must be displayed in all parked vehicles. Accordingly, the process may proceed similarly to the process described with reference to FIG. 8, however, instead of the license plate reader 106, the patrol person may patrol the parking lot in search of properly displayed decals and verifying whether the decals are registered with the server 104, or have expired. Such monitoring process may begin at step 900, where the patrol person patrols the parking lot. The patrol person may use a decal scanner, communicatively coupled with the server 104, which determines the decal number and sends the decal number, over the network 100, to the server 104. The decal number may be formed as a barcode, alphanumeric number, or other identifier. In step 902, the server 104 may receive the decal number. In step 904, the server 104 may determine whether the decal number matches any registered decal numbers. Registration of the decal numbers with the server 104 may occur as part of the process for generating the decal for the resident. For example, once the decal is generated, the server 104 may store the decal number in its memory/database.

If the answer is "no," and the decal number does not match any registered decal numbers, the process may proceed to step 906, where the server 104 determines that a parking violation has occurred. In one embodiment, the server 104 may communicate, over the network 100, a parking violation message as a result of determining that a parking violation has occurred. In one embodiment, the parking violation message may be a tow request to the tow service company 114. The tow request may be an email, a phone call, a text message or other communication to the tow service company 114 that a tow is requested. In another embodiment, the parking violation message may be a warning message sent over the network 100 to the relevant resident.

Alternatively, if the answer is "yes," and the decal number does match one of the registered decals, the process may proceed to step 908, where the server 104 determines whether the vehicle is parked in violation of any other portion of the residential community's parking policy. For example, the vehicle may be parked illegally in a grass area, in a new resident only parking area, or in a parking space not assigned to the resident. If the answer is "yes," and the vehicle is parked in violation of the parking policy, the process may proceed to step 906, where the server 104 determines that a parking violation has occurred. In one embodiment, the server 104 may communicate, over the network 100, a parking violation message as a result of determining that a parking violation has occurred. In one embodiment, the parking violation message may be a tow request to the tow service company 114. The tow request may be an email, a phone call, a text message or other communication to the tow service company 114 that a tow is requested. The tow request may include the license plate number of the vehicle to be towed and a name and/or address of the residential community from which the vehicle should be towed.

If the answer is "no," and the vehicle is not in violation of any other parking policies or rules, the process may return to step 900, where the patrol person continues to patrol the parking lot for parking violations by, for example, observing whether a subsequent parked vehicle is displaying a decal sticker and/or scanning the decal of the subsequent parked vehicle to verify that the decal has not expired.

Referring now briefly to FIGS. 12 and 13, an exemplary embodiment for monitoring parking lot capacity in real-time is depicted. In one embodiment, a plurality of vehicle sensors 1300 is disposed within a parking lot 1200 of a residential community. More particularly, in one embodiment, each of the plurality of vehicle sensors 1300 is disposed at a plurality of parking spaces 1202 associated with the parking lot 1200. The vehicle sensors 1300 may be any type of sensor that is operable to detect whether a vehicle is parked in a parking space. For example, the vehicle sensor 1300 may be a proximity sensor, a light sensor, a pressure sensor, and the like. In one embodiment, the vehicle sensor 1300 may be formed as an RFID tag, or RFID transmitter/receiver.

In one embodiment, each of the plurality of vehicle sensors 1300 includes a wireless communication device 1302 that communicatively couples the vehicle sensor 1300 to the server 104 over the network 100. The wireless communication device 1302 may be formed as a wireless transmitter or a wireless transceiver, such as, for example, an RF transmitter or an RF transceiver. Such wireless communication device 1302 allows each of the vehicle sensors 1300 to communicate wirelessly with the server 104. Advantageously, the plurality of vehicle sensors 1300 are operably configured to communicate continuously to provide the server 104 with a real-time total amount of occupied parking spaces 1202 for the residential community. Stated another way, the vehicle sensors 1300 allow the server 104 to continuously monitor the parking lot 1200 to determine how many parking spaces 1202 are actually occupied at any point in time. As used herein, the term "real-time" is intended to indicate the actual time during which something takes place, i.e., a determination of occupied parking spaces as such parking spaces become occupied. In one embodiment, each vehicle sensor 1300 includes a parking space identifier (e.g., B123) that is also transmitted to the server 104 and which indicates to the server 104, which parking space 1202 has just become occupied. Accordingly, in such embodiment, the server 104 may be able to determine which parking spaces 1202 are occupied, as well as, how many parking spaces 1202 are occupied.

In one embodiment, the parking management server 104 stores the maximum parking lot capacity for each of the residential communities and continuously compares the real-time total amount of occupied parking spaces 1202 with the corresponding maximum parking lot capacity. In a further embodiment, the server 104 utilizes such data to perform various parking management functions, such as to decide whether or not to approve guest parking applications; additional resident vehicle applications; notifying the tow management company 116 or tow service company 114; etc. In another embodiment, the server 104 may track how many continuous days a vehicle is parked without moving, according to the vehicle sensor 1300, and may automatically send a tow request to the tow service company 114 and/or a warning message to a corresponding resident account, as a result of the vehicle being continuously parked more than the maximum number of days allowed by the parking policy. In one embodiment, the server 104 may send a tow request over the network 100 as a result of the server 104 determining that the occupied parking spaces exceeds the total amount of registered vehicles (including resident and guest vehicles). Accordingly, the server 104 can ensure that only registered vehicles are parked in the residential community at all times. Such continuous monitoring by the server 104 serves an additional safety purpose for the residential community in some embodiments, in that the server 104 has a record of all license plates passing through the residential community and can quickly determine if an unauthorized vehicle is present.

In one embodiment, vehicle sensors 1300 may be disposed at non-parking areas 1204 within the residential community parking lot 1200. As used herein, the term "non-parking area" is intended to indicate an area within the residential community that is capable of being parked in, but which is not intended as a parking space, such as, for example, a grass area, a side walk area, a loading/unloading area, etc. Vehicle sensors 1300 may be disposed at areas within the parking lot 1200 that are commonly parked in, but are actually not authorized as a parking space. The vehicle sensors 1300 may be operably configured to continuously provide the server 104 with a real-time indication (e.g., communication message sent over the network 100) of whether the non-parking area 1204 is occupied by a vehicle. In a further embodiment, the server 104 may be operably configured to send a parking violation message as a result of determining that the non-parking area 1204 is occupied by a vehicle. For example, the server 104 may send a warning message to a resident associated with the vehicle, a message to the patrol person to go to the non-parking area 1204 to identify the vehicle and confirm that a vehicle is parked in the non-parking area 1204, and/or a tow request to the tow management company 116 or tow service company 114. Returning again to FIG. 5, the process may end at step 514.

A novel intelligent parking management system and method has been disclosed that efficiently and effectively regulates, manages, and/or enforces vehicle parking within a geographic parking area. Embodiments of the present invention an inventive parking management server and license plate reader, communicatively coupled together over a network, and that monitors authorized resident and guest parking by reading license plate numbers and verifying, with the parking management server, that such license plate numbers are currently authorized to park within the geographic parking area. In one embodiment, patrol persons may be employed to patrol the geographic parking area while utilizing the license plate readers to efficiently verify authorized vehicles with the parking management server. In addition, embodiments of the present invention provide a software user interface, accessible over the network, which allows authorized users registered with the parking management server (e.g., property managers and residents) to login to their account to view their parking policy, submit parking-related payments, receive parking-related messages, and manage other parking-related tasks, such as, for example, registering guest vehicles and ordering parking permits. Further, embodiments of the present invention provide a system of vehicle sensors distributed throughout the geographic parking area, within parking spaces and non-parking areas, that allow the parking management server to continuously receive a current total amount of occupied parking spaces and/or unoccupied parking spaces, thereby monitoring, in real-time, the actual parking capacity of the geographic parking area.

What is claimed is:

1. An intelligent parking management system for a plurality of residential communities, the system comprising:
   at least one gate disposed at an entry of one of a plurality of residential communities comprising at least one of an apartment complex, residential building, and a condominium, the at least one gate providing entry into the of one of a plurality of residential communities;
   a license plate reader operably configured to act as a gate control device for the at least one gate, the license plate reader operably configured to automatically capture at least one license plate image of an approaching vehicle to the at least one gate, the at least one gate operably configured to transition from an open position to a closed position; and
   at least one server that is communicatively coupled to, over a communications network, to the license plate reader, the at least one server including:
      a memory storing different parking policies for the plurality of residential communities having a corresponding restricted parking lot associated with each of the residential communities registered with the at least one server, the parking policies each having a plurality of parking rules associated with a community association contract or other community association agreement in place between one of the plurality of residential communities and at least one resident user of a plurality of resident users and including at least one rule limiting entry of a maximum number of total vehicles associated with the at least one resident user into the one of the plurality of residential communities through the at least one gate; and at least one processor that executes programming instructions to:
- store, on the memory, a plurality of resident user account registration requests from the plurality of resident users, each having a user indication of one of the respective communities of the plurality of residential communities associated therewith;
- communicate at least one of the plurality of resident user account registration requests to an electronic device, communicatively coupled to the server, of a third-party property manager user associated with the one of the respective communities of the plurality of residential communities indicated by the user for approval;
- create, after approval by the third-party property manager user associated with the one of the respective communities of the plurality of residential communities indicated by the user for approval, a plurality of registered resident user accounts and associate each of the respective plurality of registered user accounts with one of the plurality of residential communities, each of the registered resident user accounts having a registered license plate number associated with the registered resident user account and one of the plurality of residential communities associated therewith;
- validate the approaching vehicle to the at least one gate and place the at least one gate in the open position by comparing a license plate number determined from the at least one license plate image of the approaching vehicle to the at least one gate to the registered license plate number of the registered resident user account; and
- either issue an automatic and electronic warning to the at least one resident user or issue a parking violation associated with the license plate number determined from the at least one license plate image of the approaching vehicle based on a determination of license plate incongruousness, wherein the warning or the violation are issued when the approaching vehicle represents a total amount of vehicles associated with the at least one resident user over the maximum number of total vehicles when compared to the at least one rule limiting entry of the maximum number of total vehicles associated with the at least one resident user into the one of the plurality of residential communities of the plurality of parking rules associated with the community association contract or other community association agreement in place between the one of the respective communities of the plurality of residential communities and the at least one resident user of the plurality of resident users.

2. The intelligent parking management system for the plurality of residential communities according to claim 1, wherein the at least one processor is operably configured to execute programming instructions to:
store a guest license plate number, associated with a guest vehicle, on the memory and register the guest vehicle, if the parking rules of one of the different parking policies for the plurality of residential communities associated with one of the plurality of registered resident user accounts are complied with.

3. The intelligent parking management system for the plurality of residential communities according to claim 2, wherein:
compliance includes the guest vehicle not exceeding a maximum number of guests permitted per the one of the plurality of registered resident user accounts.

4. The intelligent parking management system for the plurality of residential communities according to claim 1, wherein the at least one processor is operably configured to execute programming instructions further comprising:
to create and associate at least one property manager user account with a corresponding one of the plurality of residential communities.

5. The intelligent parking management system for the plurality of residential communities according to claim 4, wherein the at least one processor is operably configured to execute programming instructions further comprising:
to allow the least one property manager user account to view real-time guest vehicle reports associated with the plurality of registered resident user accounts.

6. The intelligent parking management system for the plurality of residential communities according to claim 1, wherein the at least one processor is operably configured to execute programming instructions further comprising:
to receive over the communications network, from a resident's electronic device, vehicle registration information for each of the plurality of registered resident user accounts.

7. The intelligent parking management system for the plurality of residential communities according to claim 1, wherein the at least one processor of the at least one server further executes programming instructions to:
determine whether or not to validate the approaching vehicle to the at least one gate based on a comparison of the maximum parking lot capacity of the at least one of the plurality of residential communities, the maximum parking lot capacity stored on the memory of the at least one server.

8. The intelligent parking management system for the plurality of residential communities according to claim 1, wherein the at least one processor is operably configured to execute programming instructions to:
communicate a vehicle tow request, after determination of license plate incongruousness, to an electronic device of a third-party user communicatively coupled to the server, the vehicle tow request including the license plate number determined from the at least one license plate image of the approaching vehicle and including the one of a plurality of residential communities where the gate is located.

9. An intelligent parking management system for a plurality of residential communities, the system comprising:
at least one gate disposed at an entry of one of a plurality of residential communities comprising at least one of an apartment complex, residential building, and a condominium, the at least one gate providing entry into the of one of a plurality of residential communities;
a license plate reader operably configured to act as a gate control device for the at least one gate, the license plate reader operably configured to automatically capture at least one license plate image of an approaching vehicle to the at least one gate, the at least one gate operably configured to transition from an open position to a closed position; and at least one server that is communicatively coupled to, over a communications network, to the license plate reader, the at least one server including:
- a memory storing different parking policies for the plurality of residential communities having a corresponding restricted parking lot associated with each of the residential communities registered with the at least one server, the parking policies each having a plurality of parking rules associated with a community association contract or other community association agreement in place between one of the plurality of residential communities and at least one resident user of a plurality of resident users and including at least one rule limiting entry of a maximum number of total vehicles associated with the at least one resident user into the one of the plurality of residential communities through the at least one gate; and
- at least one processor that executes programming instructions to:
  - create a plurality of registered resident user accounts and associate each of the respective plurality of registered user accounts with one of the plurality of residential communities, each of the registered resident user accounts having a registered license plate number associated with the registered resident user account and one of the plurality of residential communities associated therewith;
  - validate the approaching vehicle to the at least one gate and place the at least one gate in the open position by comparing a license plate number determined from the at least one license plate image of the approaching vehicle to the at least one gate to the registered license plate number of the registered resident user account;
  - either issue an automatic and electronic warning to the at least one resident user or issue a parking violation associated with the license plate number determined from the at least one license plate image of the approaching vehicle based on a determination of license plate incongruousness, wherein the warning or the violation are issued when the approaching vehicle represents a total amount of vehicles associated with the at least one resident user over the maximum number of total vehicles when compared to the at least one rule limiting entry of the maximum number of total vehicles associated with the at least one resident user into the one of the plurality of residential communities of the plurality of parking rules associated with the community association contract or other community association agreement in place between the one of the respective communities of the plurality of residential communities and the at least one resident user of the plurality of resident users; and
  - communicate a vehicle tow request, after determination of license plate incongruousness, to an electronic device of a third-party user communicatively coupled to the at least one server, wherein the vehicle tow request including the license plate number determined from the at least one license plate image of the approaching vehicle and including the one of a plurality of residential communities where the gate is located.

10. The intelligent parking management system for the plurality of residential communities according to claim 9, wherein the at least one processor is operably configured to execute programming instructions to:
- store, on the memory, a plurality of resident user account registration requests, each having a user indication of one of the respective communities of the plurality of residential communities associated therewith;
- communicate at least one of the plurality of resident user account registration requests to an electronic device, communicatively coupled to the server, of a third-party property manager user associated with the one of the respective communities of the plurality of residential communities indicated by the user for approval; and
- create, after approval by the third-party property manager user associated with the one of the respective communities of the plurality of residential communities indicated by the user for approval, the plurality of registered resident user accounts.

\* \* \* \* \*